United States Patent
Wang et al.

(10) Patent No.: US 12,498,606 B2
(45) Date of Patent: Dec. 16, 2025

(54) DISPLAY SUBSTRATE, MANUFACTURING METHOD THEREOF AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaolin Wang, Beijing (CN); Pengcheng Fu, Beijing (CN); Zhifu Dong, Beijing (CN); Hongtao Weng, Beijing (CN); Zhiyong Li, Beijing (CN); Wu Wang, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 406 days.

(21) Appl. No.: 17/908,976

(22) PCT Filed: Oct. 29, 2021

(86) PCT No.: PCT/CN2021/127628
§ 371 (c)(1),
(2) Date: Sep. 2, 2022

(87) PCT Pub. No.: WO2023/070574
PCT Pub. Date: May 4, 2023

(65) Prior Publication Data
US 2024/0258336 A1 Aug. 1, 2024

(51) Int. Cl.
*G02F 1/1345* (2006.01)
*G02F 1/1343* (2006.01)
(Continued)

(52) U.S. Cl.
CPC ...... *G02F 1/1345* (2013.01); *G02F 1/134309* (2013.01); *G02F 1/13458* (2013.01);
(Continued)

(58) Field of Classification Search
None
See application file for complete search history.

(56) References Cited

U.S. PATENT DOCUMENTS 6,930,744 B1 * 8/2005 Ukita ............... G02F 1/13452
349/149
7,649,586 B2 * 1/2010 Kim ................ G02F 1/136204
349/40
(Continued)

FOREIGN PATENT DOCUMENTS

CN 108803173 A 11/2018
CN 211506123 U 9/2020
(Continued)

*Primary Examiner* — Dung T Nguyen
(74) *Attorney, Agent, or Firm* — Dilworth & Barrese, LLP.; Michael J. Musella, Esq.

(57) ABSTRACT

A display substrate, a manufacturing method thereof and a display device are provided. The display substrate includes a display region, a peripheral region a plurality of signal lines configured to provide signals to the display region; a plurality of contact pads configured to be electrically connected with the plurality of signal lines; at least two conductive connection lines provided on a side of the plurality of contact pads facing away from the display region. The at least two conductive connection lines include a first conductive connection line closest to the plurality of contact pads in a first direction from the display region to the peripheral region. At least part of the plurality of contact pads are provided in a first conductive layer, the first conductive connection line is provided in a second conduc- (Continued)

tive layer, and the first conductive layer and the second conductive layer are different layers.

19 Claims, 8 Drawing Sheets

(51) Int. Cl.
*G02F 1/1362* (2006.01)
*G02F 1/1368* (2006.01)
*H10D 86/01* (2025.01)
*H10D 86/40* (2025.01)
*H10D 86/60* (2025.01)

(52) U.S. Cl.
CPC ...... *G02F 1/136286* (2013.01); *G02F 1/1368* (2013.01); *H10D 86/021* (2025.01); *H10D 86/443* (2025.01); *H10D 86/60* (2025.01)

(56) References Cited

U.S. PATENT DOCUMENTS 8,482,498 B2 * 7/2013 Lin .................. G09G 3/006
345/55
2007/0279543 A1 12/2007 Park et al.
2021/0125566 A1 4/2021 Yang et al.
2022/0181355 A1 6/2022 Ma et al.

FOREIGN PATENT DOCUMENTS

CN 212625587 U 2/2021
CN 113437095 A 9/2021
WO 2021/081765 A1 5/2021

* cited by examiner

I-I

II-II

F-F

DISPLAY SUBSTRATE, MANUFACTURING METHOD THEREOF AND DISPLAY DEVICE

TECHNICAL FIELD

Embodiments of the present disclosure relate to a display substrate, a manufacturing method thereof and a display device.

BACKGROUND

Thin film transistor liquid crystal displays (TFT-LCD) have the advantages of small size, low power consumption, no radiation and the like, and thus occupies a dominant position in current flat panel display market.

According to display modes, thin film transistor liquid crystal displays are categorized into twisted nematic (TN) type, in-plane switching (IPS) type and advanced super dimension switch (ADS) type. For different applications, improvement technologies of ADS technology include high transmittance I-ADS technology, high aperture ratio H-ADS technology and high resolution S-ADS technology.

SUMMARY

Embodiments of the present disclosure provides a display substrate, a manufacturing method thereof and a display device.

According to the first aspect of the present disclosure, it is provided a display substrate, comprising: a display region and a peripheral region provided on at least one side of the display region, the display substrate further comprising: a plurality of signal lines, provided in the display region and configured to provide signals to the display region: a plurality of contact pads, provided in the peripheral region and configured to be electrically connected with the plurality of signal lines; and at least two conductive connection lines, provided in the peripheral region and on a side of the plurality of contact pads facing away from the display region, wherein the at least two conductive connection lines are spaced from each other, and the at least two conductive connection lines comprise a first conductive connection line closest to the plurality of contact pads in a first direction from the display region to the peripheral region. At least part of the plurality of contact pads are provided in a first conductive layer, the first conductive connection line is provided in a second conductive layer, and the first conductive layer and the second conductive layer are different layers.

In at least some embodiments, the plurality of contact pads comprise a first group of contact pads and a second group of contact pads, the first group of contact pads and the second group of contact pads are staggered with each other in the first direction, and the second group of contact pads are further away from the first conductive connection line than the first group of contact pads: the first group of contact pads are provided in the first conductive layer.

In at least some embodiments, the first group of contact pads and the second group of contact pads are staggered in the first direction by x contact pads, where $0.5 \leq x \leq 1.5$; and the first group of contact pads and the second group of contact pads do not overlap with the at least two conductive connection lines in a direction perpendicular to the display substrate.

In at least some embodiments, the peripheral region comprises a peripheral bonding region and a peripheral transition region provided between the peripheral bonding region and the display region: the display substrate further comprises a plurality of conductive transition lines provided in the peripheral transition region and connected with the plurality of signal lines: the plurality of contact pads are provided in the peripheral bonding region and connected with the plurality of conductive transition lines: the plurality of signal lines include a first group of signal lines and a second group of signal lines, the plurality of conductive transition lines comprise a first group of conductive transition lines and the second group of conductive transition lines, and the first group of conductive transition lines are connected to the first group of signal lines on a side close to the first group of signal lines and are connected to the first group of contact pads on a side close to the first group of contact pads; and the first group of signal lines, the first group of conductive transition lines and the first group of contact pads are all provided in the first conductive layer.

In at least some embodiments, the second group of conductive transition lines are connected to the second group of signal lines on a side close to the second group of signal lines and are connected to the second group of contact pads on a side close to the second group of contact pads: the second group of signal lines is provided in the first conductive layer, and the second group of conductive transition lines and the second group of contact pads are provided in the second conductive layer.

In at least some embodiments, the display substrate further comprises: a base substrate; and a display pixel array provided on the base substrate, the display pixel array being provided in the display region, the display pixel array comprising a display pixel driving circuit, a first display electrode, a passivation layer and a second display electrode, and the first display electrode and the second display electrode being configured to generate an electric field. The display pixel driving circuit comprises a thin film transistor, the thin film transistor comprises a gate electrode, a source electrode, a drain electrode and an interlayer insulation layer, the interlayer insulation layer is provided between the gate electrode and the source electrode as well as the drain electrode in a direction perpendicular to the base substrate. The first display electrode is provided in a same layer as the source electrode as well as the drain electrode, and the first display electrode is electrically connected with one of the source electrode and the drain electrode. The passivation layer is provided on a side of the first display electrode facing away from the base substrate. The second display electrode is provided on a side of the passivation layer facing away from the first display electrode. One of the first conductive layer and the second conductive layer is provided in a same layer as the gate electrode and the other of the first conductive layer and the second conductive layer is provided in a same layer as the source electrode as well as the drain electrode.

In at least some embodiments, the source electrode and the drain electrode are provided on a side of the gate electrode facing away from the base substrate: the first conductive layer is provided on a side of the second conductive layer facing away from the base substrate: the first conductive layer, the source electrode and the drain electrode are provided in a same layer using a same material, and the second conductive layer and the gate electrode are provided in a same layer using a same material.

In at least some embodiments, the passivation layer and the interlayer insulation layer are configured to extend to the peripheral region: the interlayer insulation layer is provided on a side of the second group of conductive transition lines facing away from the base substrate: the second group of signal lines is provided on a side of the interlayer insulation layer facing away from the second group of conductive transition lines; the passivation layer is provided on a side of the second group of signal lines and the interlayer insulation layer facing away from the base substrate: the peripheral transition region is further provided with a first via hole, a second via hole and a transition conductive pattern, the first via hole penetrates the passivation layer to expose at least one signal line in the second group of signal lines, the second via hole penetrates the passivation layer and the interlayer insulation layer to expose at least one conductive transition line, corresponding to the at least one signal line, in the second group of conductive transition lines, the transition conductive pattern covers the first via hole and the second via hole to electrically connect the at least one signal line and the at least one conductive transition line.

In at least some embodiments, the at least two conductive connection lines further comprise: a second conductive connection line, provided on a side of the first conductive connection line facing away from the plurality of contact pads, and the second conductive connection line is provided in at least one of the first conductive layer and the second conductive layer.

In at least some embodiments, the first conductive connection line and the second conductive connection line are configured to transmit signals provided by an external circuit.

In at least some embodiments, the display substrate further comprises: a base substrate: a display pixel array provided on the base substrate, the display pixel array being provided in the display region; and a dummy pixel array region provided on the base substrate, the dummy pixel array region comprising a plurality of dummy pixels provided in at least one row along at least part of a periphery of a display pixel array. Each of the dummy pixels is configured to be electrically connected with one of the plurality of contact pads.

In at least some embodiments, the dummy pixel comprises a dummy pixel driving circuit, a first dummy electrode and a second dummy electrode: the dummy pixel driving circuit comprises a first dummy thin film transistor, the first dummy thin film transistor comprises a first dummy gate electrode, a first dummy source electrode and a first dummy drain electrode: the first dummy electrode is provided in a same layer as the first dummy source electrode as well as the first dummy drain electrode: the second dummy electrode is provided on a side of the first dummy electrode facing away from the base substrate and is spaced from the first dummy electrode; and the first dummy electrode is configured to be electrically connected with one of the first dummy source electrode and the first dummy drain electrode, and the other of the first dummy source electrode and the first dummy drain electrode is configured to be electrically connected with one of the plurality of conductive transition lines.

In at least some embodiments, the first dummy electrode comprises a first dummy sub-electrode and a second dummy sub-electrode, which are spaced from each other in the first direction and are insulated from each other: the second dummy sub-electrode is provided on a side of the first dummy sub-electrode close to the display region.

In at least some embodiments, one of the first dummy electrode and the second dummy electrode is a dummy pixel electrode, and the other of the first dummy electrode and the second dummy electrode is a dummy common electrode, and the dummy pixel electrode and the dummy common electrode overlap with each other in a direction perpendicular to the base substrate: the dummy pixel electrode is a plate-shaped electrode, and the dummy common electrode is a slit-shaped electrode.

In at least some embodiments, the dummy pixel array region further comprises a plurality of second dummy thin film transistors provided at a side of the dummy pixels facing away from the display region: the plurality of second dummy thin film transistors are provided in at least one row along at least part of a periphery of the dummy pixel array region; and each of the second dummy thin film transistors comprises a second dummy gate electrode, a second dummy source electrode and a second dummy drain electrode, and one of the second dummy source electrode and the second dummy drain electrode is configured to be electrically connected with one of the plurality of conductive transition lines.

In at least some embodiments, each of the at least part of the plurality of contact pads extends along the first direction, and an extension direction of at least part of each of the at least two conductive connection lines intersects with the first direction.

In at least some embodiments, a minimum first distance between the first conductive connection line and the at least part of the plurality of contact pads in the first direction is greater than or equal to 10 microns.

In at least some embodiments, the extension direction of the at least part of each of the at least two conductive connection lines is perpendicular to the first direction.

In at least some embodiments, a first distance between the first conductive connection line and the at least part of the plurality of contact pads in the first direction is greater than or equal to 10 microns.

In at least some embodiments, the first distance is smaller than a line width of the first conductive connection line.

In at least some embodiments, the display substrate further comprises a plurality of input contact pads provided in the peripheral region, wherein: the plurality of input contact pads comprise at least two groups of input contact pads, the at least two groups of input contact pads comprise a first group of input contact pads and a second group of input contact pads, and each of the at least two conductive connection lines is electrically connected between the first group of input contact pads and the second group of input contact pads; and the first group of input contact pads is configured to receive an external signal provided by an external circuit, and each of the at least two conductive connection lines is configured to transmit the external signal received by the first group of input contact pads to the second group of input contact pads.

According to the second aspect of the present disclosure, it is provided a display device, comprising the afore-mentioned display substrate.

In at least some embodiments, the display device further comprises a driving chip, and the display substrate further comprising a plurality of input contact pads provided in the peripheral region, wherein: the plurality of input contact pads comprise at least two groups of input contact pads, the at least two groups of input contact pads comprise a first group of input contact pads and a second group of input contact pads, and each of the at least two conductive connection line is electrically connected between the first group of input contact pads and the second group of input contact pads; and the plurality of contact pads are electrically connected with the driving chip and serve as output contact pads of the driving chip, and the driving chip is configured to provide a control signal to the plurality of contact pads.

According to the second aspect of the present disclosure, it is provided a manufacturing method of a display substrate, comprising: forming a plurality of signal lines, a plurality of contact pads and at least two conductive connection lines, wherein: the plurality of signal lines are provided in a display region of the display substrate and configured to provide signals to the display region, the plurality of contact pads are provided in a peripheral region of the display substrate and electrically connected with the plurality of signal lines, the at least two conductive connection lines are provided in the peripheral region and on a side of the plurality of contact pads facing away from the display region, and the at least two conductive connection lines comprise a first conductive connection line closest to the plurality of contact pads in a first direction from the display region to the peripheral region; and at least part of the plurality of contact pads are provided in a first conductive layer, the first conductive connection line is provided in a second conductive layer, and the first conductive layer and the second conductive layer are different layers.

In at least some embodiments, a first group of contact pads among the plurality of contact pads is provided in the first conductive layer.

In at least some embodiments, the manufacturing method further comprises: forming a plurality of conductive transition lines in a peripheral transition region of the peripheral region and being electrically connected with the plurality of signal lines, and the plurality of contact pads being electrically connected with the plurality of conductive transition lines: wherein a first group of signal lines among the plurality of signal lines, a first group of conductive transition lines among the plurality of conductive transition lines and the first group of contact pads are all provided in the first conductive layer and integral with each other.

In at least some embodiments, a second group of signal lines among the plurality of signal lines is provided in the first conductive layer, and a second group of conductive transition lines among the plurality of conductive transition lines and a second group of contact pads among the plurality of contact pads are provided in the second conductive layer and are integral with each other.

BRIEF DESCRIPTION OF THE DRAWINGS

In order to clearly illustrate the technical solution of the embodiments of the disclosure, the drawings of the embodiments will be briefly described in the following: it is obvious that the described drawings are only related to some embodiments of the disclosure and thus are not limitative of the disclosure.

DETAILED DESCRIPTION

Figure 1:
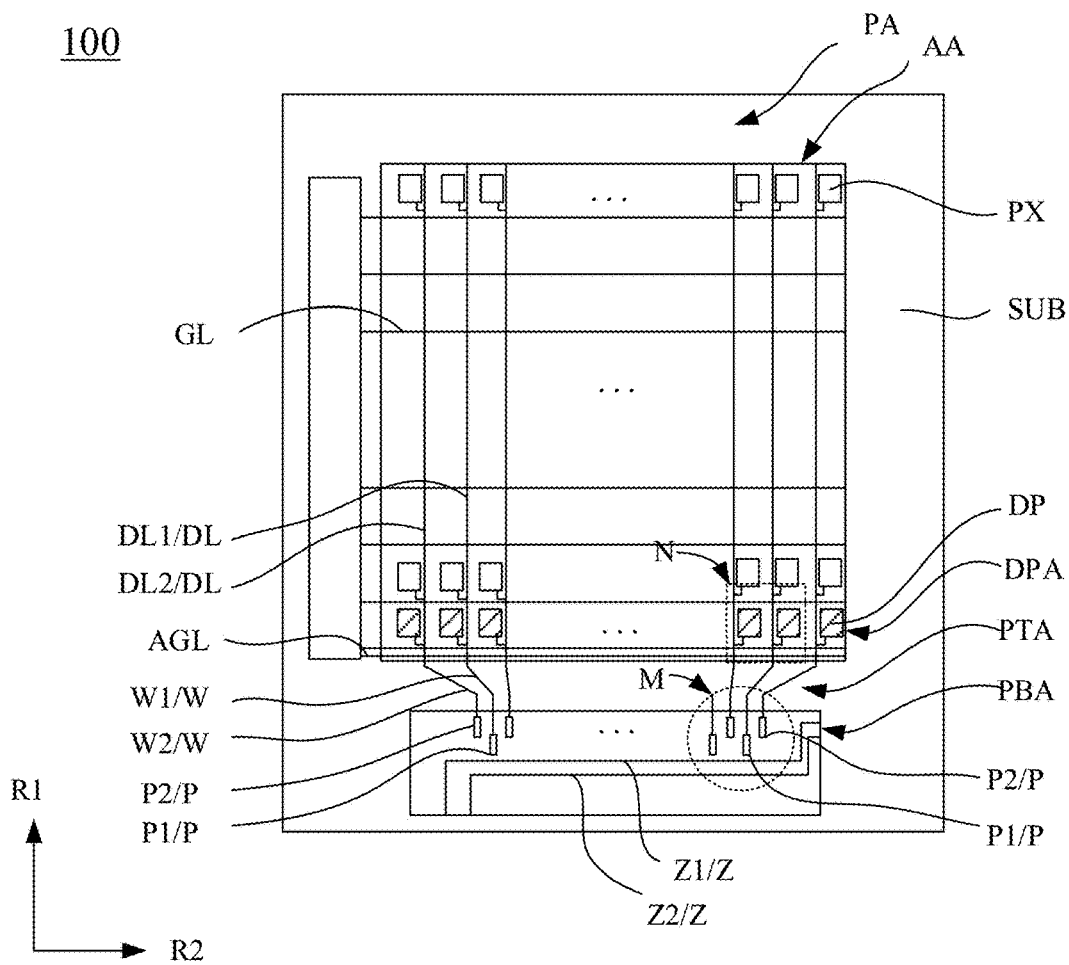
FIG. 1 is a schematic structural view of a display substrate provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

During the manufacturing procedure of the display substrate, some special manufacturing processes may cause static electricity. For example, in the manufacturing procedure of the liquid crystal display substrate, while an alignment layer of the liquid crystal display substrate is rubbed, and the static electricity is generated because of rubbing or redistribution of charges caused by mutual attraction of charges. The inventors of the present disclosure find that the static electricity generated by the above rubbing process may flow into the display region from the non-display region, resulting in poor display of the display region. For example, the poor display exhibits as bright lines (e.g., X-shaped bright lines) or bright spots. Moreover, with the increase of the usage times of the rubbing cloth for rubbing the alignment layer, the occurrence of the poor display tends to increase gradually, thus seriously affecting the display effect of the display device.

For example, the display substrate of the present disclosure includes a peripheral region, a plurality of contact pads are provided in the peripheral region: signal lines in the display region are electrically connected with the plurality of contact pads and further are electrically connected with an external circuit through the plurality of contact pads. A plurality of input contact pads and a plurality of conductive connection lines are further provided in the peripheral region, and a part of the plurality of the input contact pads are connected with the external circuit to receive the signals provided by the external circuit. The conductive connection lines are electrically connected between the part of the plurality of input contact pads and another part of the plurality of input contact pads, and are used for transmitting the signals from the part of the plurality of input contact pads to the another part of the plurality of input contact pads. The another part of the plurality of input contact pads transmits the signals to a driving chip (the driving chip is bonded in the peripheral region), and the driving chip provides the signals to the plurality of contact pads and further transmits the signals to the display region through the plurality of contact pads.

Generally, in order to achieve the narrow frame of the display device, it is necessary to reduce the distance between the contact pads and the conductive connection lines in the peripheral region, so that the components in the peripheral region are provided more compact. However, in the case that the contact pads are too close to the conductive connection lines, the static electricity generated by the rubbing process may form a tip electric field between the contact pads and the conductive connection lines, resulting in that the static electricity is released and conducted to the contact pads and then is transmitted to the signal lines of the display region. In this way, the static electricity interferes with the signals inherently transmitted by the signal lines, resulting in poor display of the display region.

In addition, in the routing path of the signal lines from the display region to the peripheral region, some signal lines comprise portions provided in different layers and these portions are connected with each other by a transition hole structure. The inventors also find that in the case that the static electricity is generated in the peripheral region, breakdown caused by the static electricity easily occurs on the signal line with the transition hole (for example, the breakdown occurs at the transition hole), and thus it is easier to cause adverse influence on the signals transmitted by the signal lines.

To solve at least one of the above problems, at least one embodiment of the present disclosure provides a display substrate, the display substrate includes a display region and a peripheral region provided on at least one side of the display region. The display substrate further comprises a plurality of signal lines, a plurality of contact pads and at least two conductive connection lines. The plurality of signal lines are provided in the display region and configured to provide signals to the display region. The plurality of contact pads are provided in the peripheral region and are electrically connected with the plurality of signal lines. The at least two conductive connection lines are provided in the peripheral region and at a side of the plurality of contact pads facing away from the display region. The at least two conductive connection lines are spaced from each other. The at least two conductive connection lines include a first conductive connection line closest to the plurality of contact pads in a first direction from the display region to the peripheral region. At least part of the plurality of contact pads is provided in a first conductive layer, the first conductive connection line is provided in a second conductive layer, and the first conductive layer and the second conductive layer are different layers.

In the display substrate provided by at least one embodiment of the present disclosure, by respectively arranging at least part of the plurality of contact pads and the first conductive connection line closest to the at least part of the plurality of contact pads in two different conductive layers, it is possible to avoid the generation of a tip electric field between the at least part of the plurality of contact pads and the first conductive connection line, thereby preventing electrostatic discharge and transmission, and reducing or even eliminating display defects in the display region.

In the embodiments of the present disclosure, "different layers" means that two functional layers are provided at different levels of the display substrate, and "same layer" means that two functional layers are provided at the same level of the display substrate. For example, the display substrate includes a base substrate and layers stacked on the base substrate, each layer represents a level.

In the embodiments of the present disclosure, "component A is configured to be electrically connected with component B" means that the component A is electrically connected with the component B under certain circumstances, but it does not mean that the component A is always electrically connected with the component B. For example, in some cases, the component A is electrically connected to the component B, while in other cases, the component A is not electrically connected to the component B.

The present disclosure is explained by the following exemplary embodiments. In order to keep the following description of the embodiments of the present disclosure clear and concise, detailed descriptions of known functions and known components may be omitted. In the case that any component of the embodiments of the present disclosure appears in more than one drawing, the component is represented by the same reference numeral in each drawing.

In the drawings of the present disclosure, the first direction R1 and the second direction R2 are parallel to a main surface of the base substrate, and the third direction R3 is perpendicular to the main surface of the base substrate SUB. In the embodiments of the present disclosure, "a plurality of" refers to two or more than two.

Figure 2:
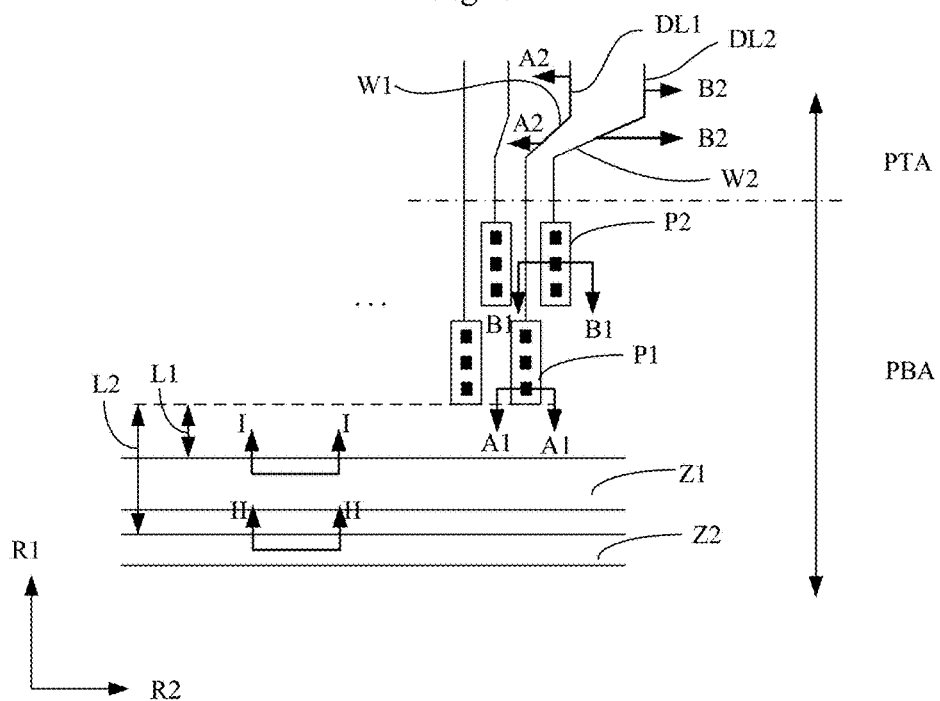
FIG. 2 is an enlarged partial structural view of a region M of the display substrate of FIG. 1.

FIG. 1 is a structural schematic view of a display substrate provided by an embodiment of the present disclosure. FIG. 2 is an enlarged partial structural view of a region M of the display substrate of FIG. 1.

As shown in FIG. 1, for example, the display substrate 100 provided by at least one embodiment of the present disclosure includes a display region AA and a peripheral region PA surrounding the display region AA. The display region AA is configured to display images, and the peripheral region PA is a non-display region.

For example, the peripheral region PA includes a peripheral bonding region PBA provided on one side of the display region AA (for example, the lower side as shown in the Figure) and a peripheral transition region PTA provided between the peripheral bonding region PBA and the display region AA. It can be understood that the peripheral bonding region PBA and the peripheral transition region PTA may be provided on other side of the display region AA (for example, the left side of the display region AA), which have been omitted in the Figure for the sake of simplification.

For example, the display substrate 100 includes a base substrate SUB, and the display region AA, the peripheral transition region PTA and the peripheral bonding region PBA are all provided on the base substrate SUB, that is, an orthographic projection of each of the above regions is on the base substrate SUB. The display region AA includes a pixel array, and scanning lines (gate lines), data lines, power lines and the like which provide control signals, data signals, voltage signals and the like for the pixel array.

For example, the display substrate 100 includes a plurality of first signal lines and a plurality of second signal lines: the plurality of first signal lines for example are the data lines DL extending in the first direction R1, and the plurality of second signal lines for example are the gate lines GL extending in the second direction R2 (for example, the direction perpendicular to the first direction R1). The plurality of data lines DL and the plurality of gate lines GL intersect with each other to define a plurality of display pixel regions, and each display pixel region is provided with a display pixel PX. The plurality of display pixels PX are provided in an array to form the display pixel array.

In the embodiments of the present disclosure, for the sake of simplification, the data lines DL and the gate lines GL in FIG. 1 are shown as straight lines, respectively. It can be understood that the data lines DL and the gate lines GL may be bent lines or curve lines, and the embodiments of the present disclosure are not limited thereto.

The gate lines GL and the data lines DL for example extend or are routed to the peripheral bonding region PBA provided on at least one side of the display region AA. For example, a plurality of conductive transition lines W are provided in the peripheral transition region PTA, and the plurality of data lines DL are electrically connected with the plurality of conductive transition lines W in one-to-one correspondence, so that the plurality of data lines DL are further electrically connected with a driving chip (not shown in FIG. 1) provided in the peripheral bonding region PBA. For example, the gate lines GL are electrically connected with corresponding conductive transition lines (not shown) in one-to-one correspondence so that the gate lines are further electrically connected with another driving chip (not shown) provided in the peripheral bonding region on the left side of the display region AA. The embodiments of the present disclosure are explained by taking the data lines DL and the conductive transition lines W in the peripheral transition region PTA at a lower side of the display region AA as an example.

For example, the peripheral bonding region PBA is provided on a side of the peripheral transition region PTA facing away from the display region AA. The peripheral bonding region PBA is configured to electrically connect an external circuit with the display substrate 100 through a bonding process. For example, the external circuit includes a flexible printed circuit board or the like for providing external signals to a plurality of contact pads P. The peripheral bonding region PBA is provided with the plurality of contact pads P, which are provided on a side of the plurality of conductive transition lines W facing away from the display region AA and are electrically connected with the plurality of conductive transition lines W in one-to-one correspondence. One end of the conductive transition line W extends to the display region AA and is electrically connected with the data line DL in the display region AA, and the other end of the conductive transition line W extends to the peripheral bonding region PBA and is electrically connected with the contact pad P. The conductive transition lines W are formed, for example, in the same layer as the data lines DL in the display region AA so that the conductive transition lines W are integral with the data lines DL; or, the conductive transition lines W and the data lines DL are formed in different layers so that the conductive transition lines W are electrically connected to the data lines DL through transition holes in the insulation layer provided between the conductive transition lines W and the data lines DL.

For example, the peripheral bonding region PAB is further provided with two conductive connection lines Z for transmitting different external signals. The two conductive connection lines Z are provided on a side of the plurality of contact pads P facing away from the display region AA, and the two conductive connection lines Z are spaced from each other. For example, the two conductive connection lines Z include a first conductive connection line Z1 and a second conductive connection line Z2, the first conductive connection line Z1 is closest to the plurality of contact pads P in the first direction R1 from the display region AA to the peripheral region PA. The second conductive connection line Z2 is provided on a side of the first conductive connection line Z1 facing away from the plurality of contact pads P. For example, the first conductive connection line Z1 is used for transmitting a working voltage VDD, and the second conductive connection line Z2 is used for grounding. Preferably, the first conductive connection line Z1 and the second conductive connection line Z2 are insulated from each other.

In the embodiments of the present disclosure, FIG. 1 only shows two conductive connection lines Z1 and Z2, and it can be understood that more conductive connection lines may be provided in the peripheral bonding region PAB, which is not limited by the embodiments of the present disclosure.

In the embodiments of the present disclosure, for the sake of simplification, the first direction R1 being a vertical direction is taken as an example for explanation. It can be understood that the term "the first direction from the display region AA to the peripheral region PA" refers to an orientation, and any direction from the display region to the peripheral region is included in the category of the first direction. Thus, the first direction R1 is not necessarily the vertical direction, but for example is an oblique direction inclined at a certain angle with respect to the vertical direction, even a horizontal direction, etc. The second direction R2 is a direction perpendicular to the first direction R1.

Figure 3:
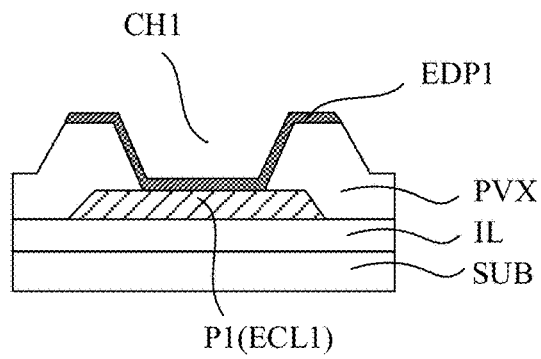
FIG. 3 is a schematic cross-sectional view taken along a line A1-A1 of FIG. 2.
Figure 4:
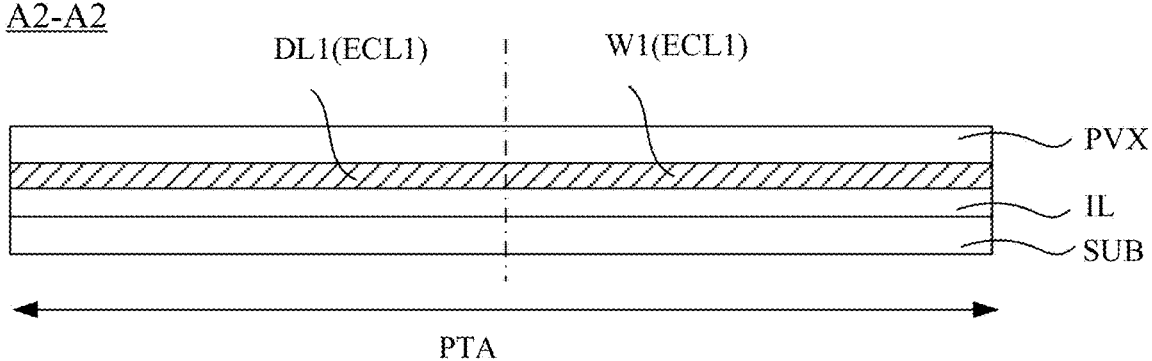
FIG. 4 is a schematic cross-sectional view taken along a line A2-A2 of FIG. 2.
Figure 5:
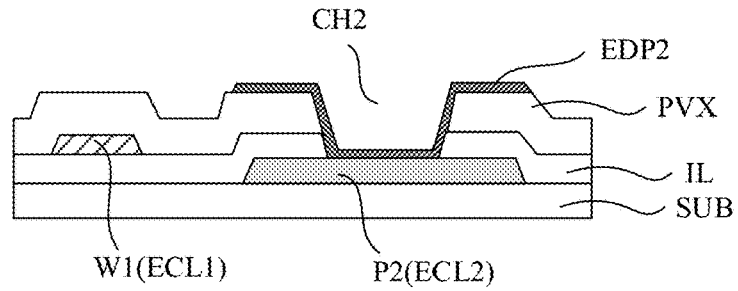
FIG. 5 is a schematic cross-sectional view taken along a line B1-B1 of FIG. 2.
Figure 6:
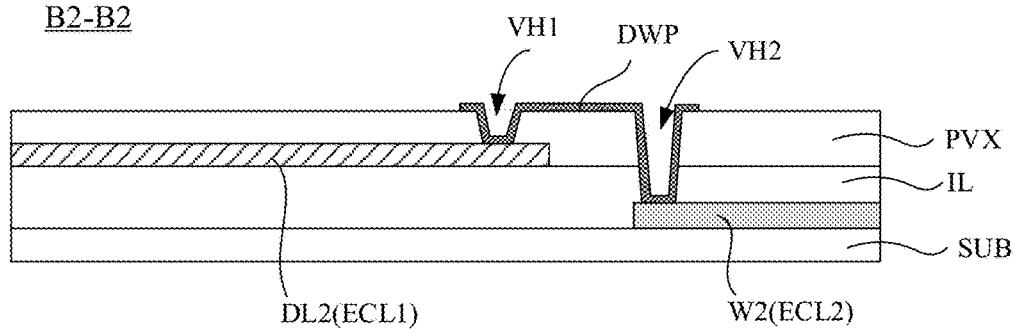
FIG. 6 is a schematic cross-sectional view taken along a line B2-B2 of FIG. 2.
Figure 7:
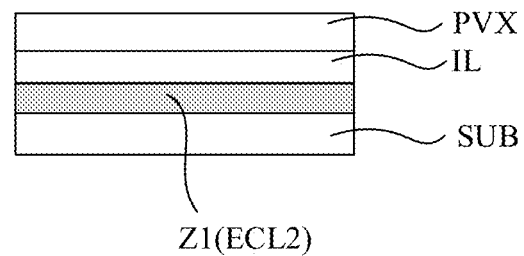
FIG. 7 is a schematic cross-sectional view taken along a line I-I of FIG. 2.
Figure 8:
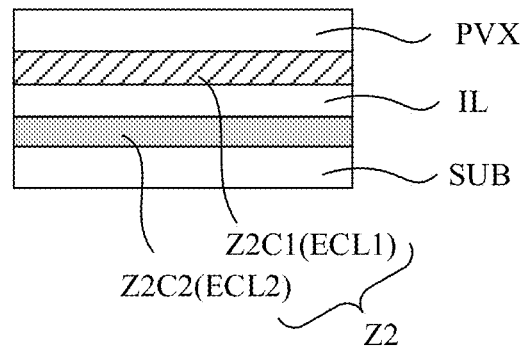
FIG. 8 is a schematic cross-sectional view taken along a line II-II of FIG. 2.

FIG. 3 is a schematic cross-sectional view taken along the line A1-A1 of FIG. 2. FIG. 4 is a schematic cross-sectional view taken along a line A2-A2 of FIG. 2. FIG. 5 is a schematic cross-sectional view taken along a line B1-B1 of FIG. 2. FIG. 6 is a schematic cross-sectional view taken along a line B2-B2 of FIG. 2. FIG. 7 is a schematic cross-sectional view along a line I-I of FIG. 2. FIG. 8 is a schematic cross-sectional view taken along a line II-II of FIG. 2.

As shown in FIGS. 1 and 2, for example, the plurality of contact pads P includes a first group of contact pads P1 and a second group of contact pads P2. The first group of contact pads P1 includes a plurality of first contact pads P1, and the second group of contact pads P2 includes a plurality of second contact pads P2. The plurality of data lines DL includes a first group of data lines DL1 and a second group of data lines DL2. The first group of data lines D1 includes a plurality of first data lines D1, and the second group of data lines D2 includes a plurality of second data lines D2. The plurality of conductive transition lines W includes a first group of conductive transition lines W1 and a second group of conductive transition lines W2. The first group of conductive transition lines W1 includes a plurality of first conductive transition lines W1, and the second group of conductive transition lines W2 includes a plurality of second conductive transition lines W2.

For example, the first group of conductive transition lines W1 are electrically connected to the first group of data lines DL1 on one side close to the first group of data lines DL1, and are electrically connected to the first group of contact pads P1 at the other side close to the first group of contact pads P1. The second group of conductive transition lines W2 are electrically connected to the second group of data lines DL2 at one side close to the second group of data lines DL2, and are electrically connected to the second group of contact pads P2 at the other side close to the second group of contact pads P2. For example, first ends (not shown) of the plurality of first conductive transition lines W1 close to the first data line D1 are electrically connected with the plurality of first data lines D1 in one-to-one correspondence, and second ends (not shown) of the plurality of first conductive transition lines W1 close to the first contact pads P1 are electrically connected with the plurality of first contact pads P1 in one-to-one correspondence. For example, first ends (not shown) of the second conductive transition lines W2 close to the second data lines D2 are electrically connected with the second data lines D2 in one-to-one correspondence, and second ends (not shown) of the second conductive transition lines W2 close to the second contact pads P2 are electrically connected with the second contact pads P2 in one-to-one correspondence.

In the embodiments of the present disclosure, the first and second ends of the first conductive transition line W1 and the second conductive transition line W2 are used to describe the technical features more clearly. In actual products, there is no obvious boundary defining the first and second ends of the first conductive transition line W1 or the second conductive transition line W2.

As shown in FIGS. 3 and 7, for example, the display substrate 100 further includes a first insulation layer (e.g., an interlayer insulation layer IL) and a second insulation layer (e.g., a passivation layer PVX) which are sequentially provided on the base substrate SUB and provided in both of the display region AA to the peripheral region PA. The display substrate 100 further includes a first conductive layer ECL1 and a second conductive layer ECL2 provided in the peripheral region PA. The first conductive layer ECL1 is provided between the interlayer insulation layer IL and the passivation layer PVX in the direction perpendicular to the base substrate SUB, and the second conductive layer ECL2 is provided between the base substrate SUB and the interlayer insulation layer IL in the direction perpendicular to the base substrate SUB.

For example, the first group of contact pads P1 is provided in the first conductive layer ECL1, and the first conductive connection line Z1 is provided in the second conductive layer ECL2. Because the first conductive layer ECL1 and the base substrate SUB are separated and insulated from each other by the interlayer insulation layer IL, the first conductive layer ECL1 is not in direct contact with the base substrate SUB. The second conductive layer ECL2 is in direct contact with the base substrate SUB. Because the first conductive layer ECL1 and the second conductive layer ECL2 are provided in different layers, the first group of contact pads P1 and the first conductive connection line Z1 are also provided in different layers.

In at least some embodiments, each of at least some of the contact pads among the plurality of contact pads extends along the first direction, and an extension direction of at least part of each conductive connection line crosses the first direction. For example, each of the plurality of contact pads P extends in the first direction R1, and at least part of the first conductive connection line Z1 extends in the second direction R2. While the rubbing process is performed on the alignment layer on the display substrate, if the contact pads P and the first conductive connection line Z1 are provided in the same layer, it is easier to form a tip electric field between the contact pads P and the first conductive connection line Z1, so that electrostatic discharge and conduction occur.

In the embodiments of the present disclosure, by providing at least part of the plurality of contact pads P (i.e., the first group of contact pads P1) and the first conductive connection line Z1 in different layers, it is possible to avoid the formation of the tip electric field between the first group of contact pads P1 and the first conductive connection line Z1. In this way, even if the static electricity is generated in the peripheral bonding region PBA, the risk of the static electricity being transmitted to the display region is reduced, thereby reducing or even eliminating the poor display phenomenon in the display region.

As shown in FIG. 4, for example, the first data line DL1 and the first conductive transition line W1 are all provided in the first conductive layer ECL1, so that the first data line DL1, the first conductive transition line W1 and the first contact pad P1 are all provided in the first conductive layer ECL1.

For example, in the case that the data line DL extends from the display region AA to the peripheral bonding region PBA, if the transition hole structure is adopted, the static electricity is more likely to break down at the transition hole, thus it is easier to cause adverse influence on the signals transmitted on the data line DL.

In the embodiments of the present disclosure, the first group of data lines DL1 and the first group of conductive transition lines W1 which are electrically connected with the first group of contact pads P1 are provided in the same layer as the first group of contact pads P1, that is, they are all provided in the first conductive layer ECL1, so that the first group of data lines DL1 do not need to be electrically connected with the first group of contact pads P1 through the transition holes, thus reducing the risk of the static electricity being introduced into the data lines through the transition holes, and eliminating the risk of the transition holes being damaged by the static electricity.

In at least some embodiments, the second group of data lines DL2 and the second group of conductive transition lines W2 which are electrically connected to the second group of contact pads P2 are provided in the same conductive layer (for example, the first conductive layer ECL1 or the second conductive layer ECL2) as the second group of contact pads P2, or all of them are provided in two different conductive layers. In the case that all of them are provided in the same conductive layer, the manufacturing process is simplified. In the case that they are provided in different conductive layers, they are connected with each other by using the transition hole structure, which reduces the space occupied by the signal lines or conductive transition lines in the peripheral region and improve the space utilization ratio of the peripheral region. The following description will be provided by taking the second group of contact pads P2, the second group of data lines DL2 and the second group of conductive transition lines W2 provided in different layers as an example.

For example, as shown in FIG. 5, the second group of contact pads P2 are provided in the second conductive layer ECL2. As shown in FIG. 6, the second group of conductive transition lines W2 electrically connected to the second group of contact pads P2 are provided in the second conductive layer ECL2: the second group of data lines DL2 electrically connected to the second group of conductive transition lines W2 are provided in the first conductive layer ECL1. That is, the second group of contact pads P2 and the second group of conductive transition lines W2 are provided in a layer different from the second group of data lines DL2. Further, for example, in the peripheral transition region PTA shown in FIG. 6, the second conductive transition line W2 is electrically connected to the second data line D2 through a first via-hole VH1, a second via-hole VH2, and a transition conductive pattern DWP extending into the first via-hole VH1 and the second via-hole VH2, so that the second group of data lines DL2 are electrically connected to the second conductive transition line W2 through the transition holes such as the first via-hole VH1 and the second via-hole VH2 and further are electrically connected to the second group of contact pads P2.

For example, in order to reduce the space occupied by the conductive transition lines in the peripheral region, the distance between the conductive transition lines is designed to be narrow: however, in the case that the distance between the conductive transition lines is too small, there may be a problem of signal crosstalk. Especially in the case that the first conductive transition line W1 and the second conductive transition line W2 are both provided in the same conductive layer (for example, the first conductive layer ECL1), the problem of signal crosstalk will be more obvious.

In the embodiments of the present disclosure, the second conductive transition line W2 is provided in the second conductive layer ECL2 by adopting the design of the transition hole. Because the first conductive layer ECL1 and the second conductive layer ECL2 are insulated from each other, even if the distance between the first conductive transition line W1 and the second conductive transition line W2 is relatively small, the problem of signal crosstalk between the first conductive transition line W1 and the second conductive transition line W2 is avoided. In this way, the distance between the first conductive transition line W1 and the second conductive transition line W2 is further reduced without affecting the signal transmission of the first conductive transition line W1 and the second conductive transition line W2, and the space utilization ratio of the peripheral region is improved.

In the embodiments of the present disclosure, only for illustrative purposes, the electrical connection between the second data line DL2 and the second conductive transition line W2 is realized by using the first via-hole VH1 penetrating the passivation layer PVX, the second via-hole VH2 penetrating both the passivation layer PVX and the interlayer insulation layer IL, and the transition conductive pattern DWP. In other embodiments, the electrical connection between the second data line DL2 and the second conductive transition line W2 may be realized by other transition hole structure: for example, a via hole is formed in the interlayer insulation layer IL to expose the second conductive transition line W2, and then the second data line DL2 provided on the interlayer insulation layer IL is formed to cover the via hole so as to be electrically connected with the exposed second conductive transition line W2. Thus, the embodiments of the present disclosure do not limit the electrical connection manner between the second data line DL2 and the second conductive transition line W2.

As shown in FIG. 3, for example, a first conductive pattern EDP1 is further provided on a side of the passivation layer PVX facing away from the base substrate SUB. The passivation layer PVX covers the edge of the first contact pad P1 and is provided with a first contact hole CH1. The first conductive pattern EDP1 is electrically connected to the first contact pad P1 through the first contact hole CH1. In this way, the first contact pad P1 for example is electrically connected with an external circuit through the first conductive pattern EDP1, thereby realizing signal transmission.

As shown in FIG. 5, for example, a second conductive pattern EDP2 is further provided on the side of the passivation layer PVX facing away from the base substrate SUB. An insulation lamination of the passivation layer PVX and the interlayer insulation layer IL covers the edge of the second contact pad P2 and is provided with a second contact hole CH2. The second conductive pattern EDP2 is electrically connected to the second contact pad P2 through the second contact hole CH2. In this way, the second contact pad P2 for example is electrically connected to an external circuit through the second conductive pattern EDP2, thereby realizing signal transmission.

In the embodiments of the present disclosure, the edge of the contact pad includes an edge extending along the periphery of the contact pad.

As shown in FIG. 1, for example, the first group of contact pads P1 and the second group of contact pads P2 do not overlap with two conductive connection lines Z1 and Z2 in the direction perpendicular to the display substrate, and the first group of contact pads P1 and the second group of contact pads P2 are insulated from the two conductive connection lines Z1 and Z2. Here, "the direction perpendicular to the display substrate" refers to the direction perpendicular to the main surface of the display substrate, and for example is understood as the direction perpendicular to the main surface of the base substrate SUB. In other words, there is no overlap between the orthographic projections of the first group of contact pads P1 and the second group of contact pads P2 on the base substrate SUB and the orthographic projections of the two conductive connection lines Z1 and Z2 on the base substrate SUB.

For example, both of the first group of contact pads P1 and the second group of contact pads P2 extend along the first direction R1, and the first group of contact pads P1 and the second group of contact pads P2 are staggered by a certain distance, so that the second group of contact pads P2 is farther away from the first conductive connection line Z1 than the first group of contact pads P1. The expression "the first group of contact pads P1 and the second group of contact pads P2 being staggered" means that the center point of the first contact pad P1 in the first group of contact pads P1 and the center point of the second contact pad P2 in the second group of contact pads P2 are not provided in the same straight line in the second direction R2.

In the embodiments of the present disclosure, the second group of contact pads P2 are electrically connected to the second group of data lines DL2 through the transition hole structure. By providing the second group of contact pads P2 farther away from the first conductive connection line Z1 than the first group of contact pads P1, the risk of the static electricity caused by rubbing being introduced into the second group of contact pads P2 is reduced, and the transition hole structure for connecting the second group of data lines DL2 and the second group of contact pads P2 is prevented from being damaged by static electricity.

It should be noted that the expression "the first group of contact pads P1 and the second group of contact pads P2 being staggered" does not limit the length of the first contact pad P1 in the first direction R1 and the length of the second contact pad P2 in the first direction R1, nor does necessarily mean that the staggered length is the length of one contact pad, as long as the center point of the first contact pad P1 and the center point of the second contact pad P2 are not provided in the same straight line in the second direction R2. For example, as shown in FIG. 2, the first group of contact pads P1 and the second group of contact pads P2 do not overlap while they are viewed from left to right in the second direction R2. It can be understood that in other embodiments, the first group of contact pads P1 overlap with the second group of contact pads P2 in the second direction R2, and the embodiments of the disclosure do not limit thereto.

In the embodiments of the present disclosure, the length of the first contact pad P1 in the first direction R1 is equal to or different from the length of the second contact pad P2 in the first direction R1. As shown in FIG. 2, for example, the length of the first contact pad P1 is equal to the length of the second contact pad P2, and the first contact pad P1 and the second contact pad P2 are staggered by at least one contact pad along the first direction R1. In this case, not only the manufacturing process is simplified, but also the static electricity is prevented from being introduced into the second contact pad P2.

The relative position between the first contact pad P1 and the second contact pad P2 shown in FIG. 2 is only for illustrative purpose. It can be understood that in other embodiments, the first contact pad P1 and the second contact pad P2 are staggered by x contact pad along the first direction R1, where $0.5 \leq x \leq 1.5$.

In the embodiments of the present disclosure, the number of the first contact pads P1 and the number of the second contact pads P2 are equal to or different from each other. The plurality of first contact pads P1 for example are provided at equal or unequal intervals, the plurality of second contact pads P2 for example are provided at equal or unequal intervals, and the embodiments of the present disclosure do not limit thereto.

In the embodiments of the present disclosure, for illustrative purposes, the first contact pads P1 and the second contact pads P2 in FIG. 2 are alternately provided in the second direction R2, that is, one first contact pad P1 is provided between every two adjacent second contact pads P2. It can be understood that in other embodiments, two, three or more first contact pads P1 for example are provided between every two adjacent second contact pads P2, two, three or more second contact pads P2 are provided between every two adjacent first contact pads P1, and the embodiments of the present disclosure do not limit thereto.

In addition, in other embodiments of the present disclosure, only a part of the first contact pad P1 and the second contact pad P2 are alternatively provided, or only a part of the second contact pad P2 and the first contact pad P1 are alternatively provided, which also achieve the purpose of the present disclosure.

As shown in FIG. 8, for example, the second conductive connection line Z2 includes a first conductive portion Z2C1 in the first conductive layer ECL1 and a second conductive portion Z2C2 in the second conductive layer ECL2. The first conductive portion Z2C1 and the second conductive portion Z2C2 overlap with each other in the direction perpendicular to the base substrate SUB.

In the embodiments of the present disclosure, in the case that the impedance requirements on the first conductive connection line and the second conductive connection line are the same, the first conductive connection line Z1, extending along the direction perpendicular to the first contact pad P1 (for example, along the second direction R2), has a larger line width because the first conductive connection line Z1 is provided in only one single conductive layer, while the second conductive connection line Z2, extending along the direction perpendicular to the first contact pad P1 (for example, along the second direction R2), has a smaller line width because the second conductive connection line Z2 is provided in two conductive layers. In the embodiments of the present disclosure, by arranging the second conductive connection line Z2 in the first conductive layer ECL1 and the second conductive layer ECL2, the space occupied by the second conductive connection line Z2 in the peripheral bonding region is reduced without disturbing the transmission signal.

In the embodiments of the present disclosure, the line widths of the first conductive connection line Z1 and the second conductive connection line Z2 are only for illustrative purpose, and those skilled in the art may design according to actual needs, and the embodiments of the present disclosure do not limit thereto.

In addition, it can be understood that the arrangement of the second conductive connection line Z2 in the embodiments of the present disclosure is only for illustrative purpose: in other embodiments, the second conductive connection line Z2 is provided only in the first conductive layer ECL1 or only in the second conductive layer ECL2, and the embodiments of the present disclosure do not limit thereto.

As shown in FIGS. 1 and 2, for example, the first group of contact pads P1 and the second group of contact pads P2 extend along the first direction R1, at least part of the first conductive connection line Z1 and at least part of the second conductive connection line Z2 extend along the second direction R2. Thus, the included angle between the extending direction of the first group of contact pads P1 and the second group of contact pads P2 and the extending direction of at least part of the first conductive connection line Z1 and at least part of the second conductive connection line Z2 is equal to 90 degrees. It can be understood that the above included angle may not be 90 degrees, for example, greater than 0 degree and less than 90 degrees, as long as the extension direction of at least part of the first conductive connection line Z1 and at least part of the second conductive connection line Z2 crosses the extension direction of the first group of contact pads P1 and the second group of contact pads P2, and the embodiments of the present disclosure do not limit thereto.

In at least some embodiments, by increasing the distance between the plurality of contact pads P and the first conductive connection line Z1 as well as the second conductive connection line Z2, the formation of the tip electric field between the plurality of contact pads P and the conductive connection lines is further avoided, thereby avoiding the introduction of static electricity into the contact pads P.

For example, as shown in FIG. 2, the first distance L1 between the first conductive connection line Z1 and the first group of contact pads P1 in the first direction R1 is greater than or equal to 10 microns, and optionally, for example, greater than or equal to 10 microns and less than or equal to 400 microns. In one example, the first distance L1 is 10 microns, 20 microns, 30 microns, 40 microns, 50 microns, 60 microns, 70 microns, 80 microns, 90 microns or 100 microns, etc. The second distance L2 between the second conductive connection line Z2 and the first contact pad P1 in the first direction R1 is larger than the first distance L1. By providing the second conductive connection line Z2 farther away from the first group of contact pads P1 than the first conductive connection line Z1, the formation of the tip electric field between the second conductive connection line Z2 and the first group of contact pads P1 is avoided, thereby reducing the possibility of the static electricity on the second conductive connection line Z2 entering the display region through the first group of contact pads P1.

For example, the first distance L1 is smaller than the line width of the first conductive connection line Z1. The first distance L1 is smaller than the line width of the first conductive connection line Z1, which is beneficial to narrow the frame of the display panel.

The first distance L1 and the second distance L2 in the embodiments of the present disclosure are explained by taking the extension direction of the first conductive connection line Z1 and the extension direction of the first group of contact pads P1 being perpendicular with each other as an example. It can be understood that in the case that the extending direction of the first conductive connection line Z1 is not perpendicular to the extending direction of the first group of contact pads P1, the first conductive connection line Z1 and the first group of contact pads P1 have the minimum first distance L1 in the first direction R1. The minimum first distance L1 is, for example, greater than or equal to 10 microns, and optionally, greater than or equal to 10 microns and less than or equal to 400 microns. In one example, the minimum first distance L1 is 10 microns, 20 microns, 30 microns, 40 microns, 50 microns, 60 microns, 70 microns, 80 microns, 90 microns or 100 microns, etc. For example, the minimum first distance L1 is smaller than the line width of the first conductive connection line Z1.

In the embodiments of the present disclosure, the base substrate SUB for example is a glass substrate, a quartz substrate, a metal substrate, a resin substrate and the like. For example, the material of the base substrate includes an organic material, the organic material is resin material, such as polyimide, polycarbonate, polyacrylate, polyetherimide, polyethersulfone, polyethylene terephthalate, polyethylene naphthalate and the like. For example, the base substrate SUB is a flexible substrate or an inflexible substrate, which is not limited by the embodiments of the present disclosure.

In the embodiments of the present disclosure, the material of the first insulation layer and the second insulation layer for example includes an inorganic insulation material such as silicon oxide, silicon nitride, silicon oxynitride and the like, or includes an organic insulation material such as polyimide, polyphthalamide, polyamide, acrylic resin, benzocyclobutene, phenolic resin and the like. The embodiments of the present disclosure do not particularly limit the material of the first insulation layer and the second insulation layer.

In the embodiments of the present disclosure, the material of respective conductive lines for example includes a metal material or an alloy material, such as a single-layer structure or a multi-layer structure formed by molybdenum, aluminum, titanium and the like. The material of the first conductive layer and the second conductive layer for example includes a metal material or an alloy material, such as a single-layer structure or a multi-layer structure formed by molybdenum, aluminum, titanium and the like.

Figure 9:
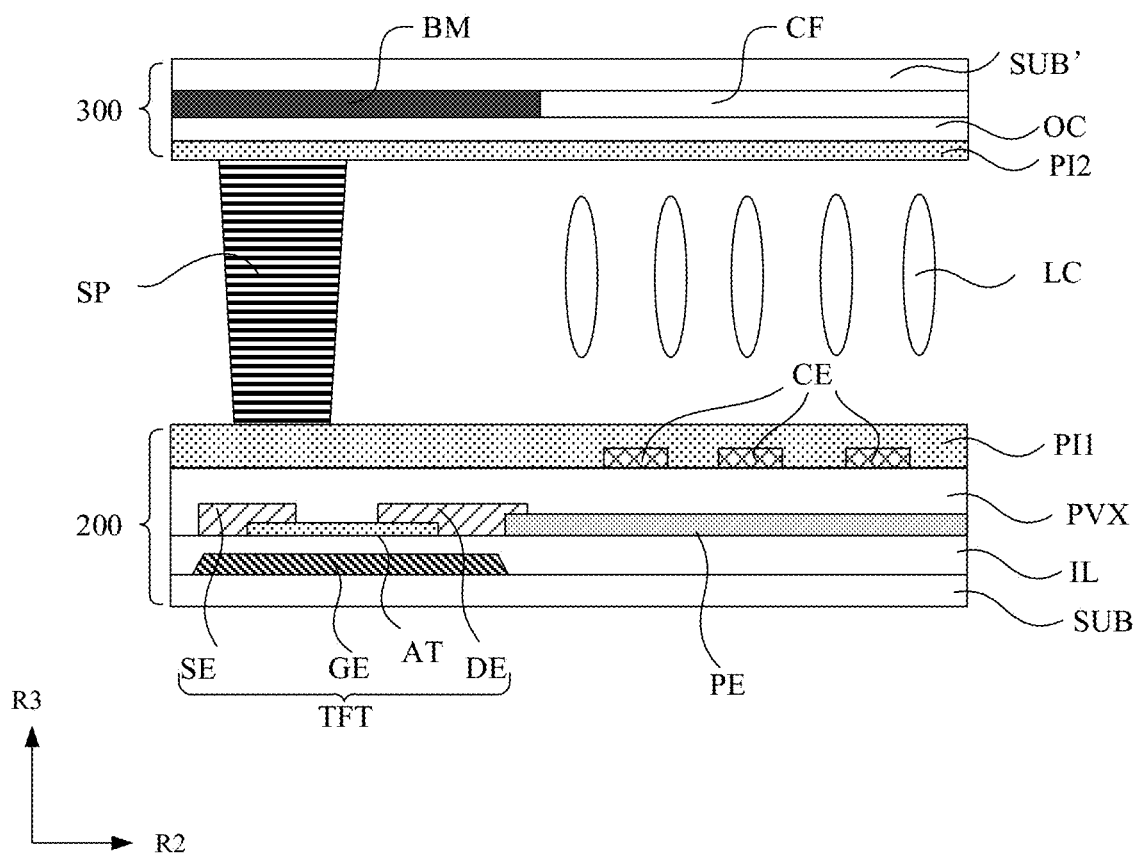
FIG. 9 is a partial cross-sectional view of a liquid crystal display device provided by an embodiment of the present disclosure.

FIG. 9 is a partial cross-sectional schematic view of a liquid crystal display device provided by an embodiment of the present disclosure.

As shown in FIG. 9, for example, the liquid crystal display device includes a liquid crystal display panel: the liquid crystal display panel includes an array substrate 200 and an opposite substrate 300 which are opposite to each other in the third direction R3, and a liquid crystal layer LC filled between the array substrate 200 and the opposite substrate 300. The array substrate 200 and the opposite substrate 300 form a sealed liquid crystal cell by a cell-assembly process using a sealant (not shown), and the liquid crystal layer LC is sealed inside the liquid crystal cell.

For example, the array substrate 200 includes the base substrate SUB and the display pixel PX formed on the base substrate SUB. The display pixel PX includes a display pixel driving circuit, a pixel electrode PE (i.e., a first display electrode), the passivation layer PVX, a common electrode CE (i.e., a second display electrode), and a first alignment layer PI1.

For example, the display pixel driving circuit includes a thin film transistor TFT, a storage capacitor (not shown) and the like, and the embodiments of the present disclosure do not limit the structure of the display pixel driving circuit. The thin film transistor TFT for example is of top-gate type or bottom-gate type, and the embodiments of the present disclosure will be explained by taking the bottom-gate type TFT as an example.

For example, the thin film transistor TFT includes a gate electrode GE, a source electrode SE and a drain electrode DE, an active layer AT, and the interlayer insulation layer IL. The gate electrode GE is provided in the same layer as the gate line GL, and the source electrode SE and the drain electrode DE are provided in the same layer as the data line DL. The interlayer insulation layer IL is provided between the gate electrode GE and the source electrode SE as well as the drain electrode DE in the third direction R3, for example, the interlayer insulation layer IL is between the gate electrode GE and the active layer AT. The source electrode SE and the drain electrode DE are provided on a side of the active layer AT facing away from the gate electrode GE and covers the active layer AT. For example, an etching barrier layer is provided on a side of the source electrode SE and the drain electrode DE facing away from the base substrate SUB to prevent the source electrode SE and the drain electrode DE from being damaged by an etching process.

For example, the pixel electrode PE is provided on a side of the interlayer insulation layer facing away from the base substrate, and is provided in the same layer as the source electrode SE and the drain electrode DE. The data line DL is electrically connected with the source electrode SE of the thin film transistor TFT, and the pixel electrode PE is electrically connected with the drain electrode DE, so that the data signal transmitted by the data line DL is transmitted to the pixel electrode PE. The passivation layer PVX is provided on a side of the pixel electrode PE facing away from the base substrate SUB, and the common electrode CE is provided on a side of the passivation layer PVX facing away from the pixel electrode PE, so that the pixel electrode PE and the common electrode CE are insulated from each other by the passivation layer PVX.

A voltage difference is applied between the pixel electrode PE and the common electrode CE (for example, the pixel electrode PE is applied with the data voltage Vdata and the common electrode CE is applied with the common voltage Vcom), and thus a transverse electric field is formed between the pixel electrode PE and the common electrode CE, which applies on the liquid crystal molecules in the liquid crystal layer LC to cause the liquid crystal molecules to deflect.

For example, the pixel electrode PE is a plate-shaped electrode, and the common electrode CE is a slit-shaped electrode including a plurality of strip electrodes. It can be understood that the pixel electrode PE may be a slit-shaped electrode and the common electrode CE may be a plate-shaped electrode, which is not limited by the embodiments of the present disclosure.

For example, the pixel electrode PE and the common electrode CE are made of a transparent conductive material, including but not limited to a transparent conductive oxide material, such as indium tin oxide (ITO), indium zinc oxide (IZO), zinc oxide (ZnO) and the like.

As shown in FIG. 9, for example, the opposite substrate 300 includes an opposite base substrate SUB' and a color filter layer CF, a black matrix layer BM and a second alignment layer PI2 provided on the opposite base substrate SUB'.

For example, the color filter layer CF is provided in the same layer as the black matrix layer BM, and is used for converting the light transmitted through the liquid crystal layer LC into the light having same color as the color filter layer CF, thereby realizing color display. The color filter layer CF includes color filter units (for example, R, G, B color filter units) provided in an array. The material of the color filter layer for example includes a photosensitive resin. In addition, a planarization layer OC is provided to cover the black matrix BM and the color filter layer CF to planarize the surface of the opposite substrate 300.

For example, the black matrix layer BM is used to prevent crosstalk or light leakage between the display pixels PX. For example, an orthographic projection of the thin film transistor TFT on the base substrate SUB in the third direction R3 falls within an orthographic projection of the black matrix layer BM on the base substrate SUB in the third direction R3. It should be noted that the color filter layer CF may be provided in a layer different from the black matrix layer BM, which is not limited by the embodiments of the present disclosure. For example, the black matrix layer and the color filter layer are provided on the array substrate 200, in this case, the black matrix layer and the color filter layer are not formed on the opposite substrate 300. The material of the black matrix layer BM for example includes a pigment with light-shielding property to prevent light leakage between the display pixels. For example, the material of the black matrix layer BM includes carbon (C) or chromium (Cr).

For example, the first alignment layer PI1 and the second alignment layer PI2 are opposite to each other in the third direction R3 for aligning the liquid crystal molecules in the liquid crystal layer LC. The first alignment layer PI1 is provided on a side of the common electrode CE of the array substrate 200 facing towards the liquid crystal layer LC. The second alignment layer PI2 is provided on a side of the planarization layer OC of the opposite substrate 300 facing towards the liquid crystal layer. The material of the first alignment layer PI1 and the second alignment layer PI2, for example, is polyimide.

For example, in order to maintain a uniform thickness of the liquid crystal cell, a plurality of columnar spacers SP are provided between the array substrate 200 and the opposite substrate 300. The columnar spacer SP is made of, for example, a shape memory polymer material. In the case that the spacer SP is rigid, the spacer SP has a good supporting effect for the opposite substrate 300, which prevents the opposite substrate 300 from being deformed under an effect of external force.

In the embodiments of the present disclosure, the liquid crystal display panel further includes a backlight module (not shown) provided on a side of the array substrate 200 facing away from the opposite substrate 300: the backlight module is on the non-display side of the liquid crystal display panel and severs as a light source for display. The backlight module for example is of an edge-in or a direct-in type, and the light source adopted in the backlight module for example is a cold cathode fluorescent lamp, a light emitting diode (LED), etc. The embodiments of the present disclosure do not limit the structure of the backlight module. In the embodiments of the present disclosure, the liquid crystal display panel for example is of transmissive type or transflective type. For example, the liquid crystal display panel is of reflective type, and in this case, there is no need to provide the backlight module in the liquid crystal display panel.

The liquid crystal display substrate shown in FIG. 9 for example is applied to an Advanced Super Dimension Switch (ADS) type liquid crystal panel or its modification.

In the embodiments of the present disclosure, the base substrate SUB, the interlayer insulation layer IL and the passivation layer PVX in the peripheral region PA shown in FIGS. 3 to 8 for example are respectively integral with the base substrate SUB, the interlayer insulation layer IL and the passivation layer PVX in the display region AA shown in FIG. 9, that is, are respectively portions, extending into the peripheral region PA, of the base substrate SUB, the interlayer insulation layer IL and the passivation layer PVX in the display region AA shown in FIG. 9. Thus, in the embodiments of the present disclosure, the level structure of each functional layer in FIGS. 3 to 8 may be referenced to the level structure of FIG. 9.

As shown in FIG. 3 to FIG. 6, FIG. 8 and FIG. 9, for example, the first conductive layer ECL1 provided in the peripheral region PA is provided in the same layer as the source electrode SE and the drain electrode DE in the display region AA, that is, the first conductive layer ECL1 and the source electrode SE as well as the drain electrode DE are provided on the interlayer insulation layer IL. In this way, in the manufacturing process, the first group of contact pads P1, the first group of data lines DL1, the second group of data lines DL2 and the first group of conductive transition lines W1 provided in the first conductive layer ECL1 are formed at the same time as the source electrode SE and the drain electrode DE, thereby simplifying the manufacturing process. Further, for example, the first conductive portion Z2C1 of the second conductive connection line Z2 is also formed at the same time as the source electrode SE and the drain electrode DE, thereby simplifying the manufacturing process of the second conductive connection line Z2.

As shown in FIG. 5 to FIG. 8 and FIG. 9, for example, the second conductive layer ECL2 provided in the peripheral region PA is provided in the same layer as the gate electrode GE in the display region AA, that is, both the second conductive layer ECL2 and the gate electrode GE are provided on the base substrate SUB. In this way, in the manufacturing process, the second group of contact pads P2 and the second group of conductive transition lines W2 provided in the second conductive layer ECL1 are formed at the same time as the gate electrode GE, thereby simplifying the manufacturing process. Further, for example, the second conductive portion Z2C2 of the second conductive connection line Z2 and the first conductive connection line Z1 are also formed at the same time as the gate electrode GE, thereby simplifying the manufacturing process of the conductive connection lines Z1 and Z2.

For example, as shown in FIG. 9, the source electrode SE and the drain electrode DE are provided on the side of the gate electrode GE facing away from the base substrate SUB. As shown in FIGS. 3 to 8, the first conductive layer ECL1 is provided on the side of the second conductive layer ECL2 facing away from the base Substrate SUB. The first conductive layer ECL1 and the source electrode SE as well as the drain electrode DE are provided in the same layer and formed by the same material, and the second conductive layer ECL2 and the gate electrode GE are provided in the same layer and formed by the same material.

In the embodiments of the present disclosure, "provided in the same layer and formed by using the same material" means that two functional components (for example, the second conductive layer ECL2 and the gate electrode GE) are formed in the same layer of the level structure of the display substrate by using the same material, so that in the manufacturing process, the two functional components are formed by using the same material layer and patterned by using the same patterning process to respectively have the required pattern and structure: for example, the material layer is formed first and then is patterned by the same patterning process to obtain the two functional components.

For example, in order to simplify the manufacturing process, the first conductive pattern EDP1 of FIG. 3, the second conductive pattern EDP2 of FIG. 5, and the transition conductive pattern DWP of FIG. 6 are formed in the same layer by using the same material as the common electrode CE of FIG. 9, thus reducing the process steps.

Figure 10:
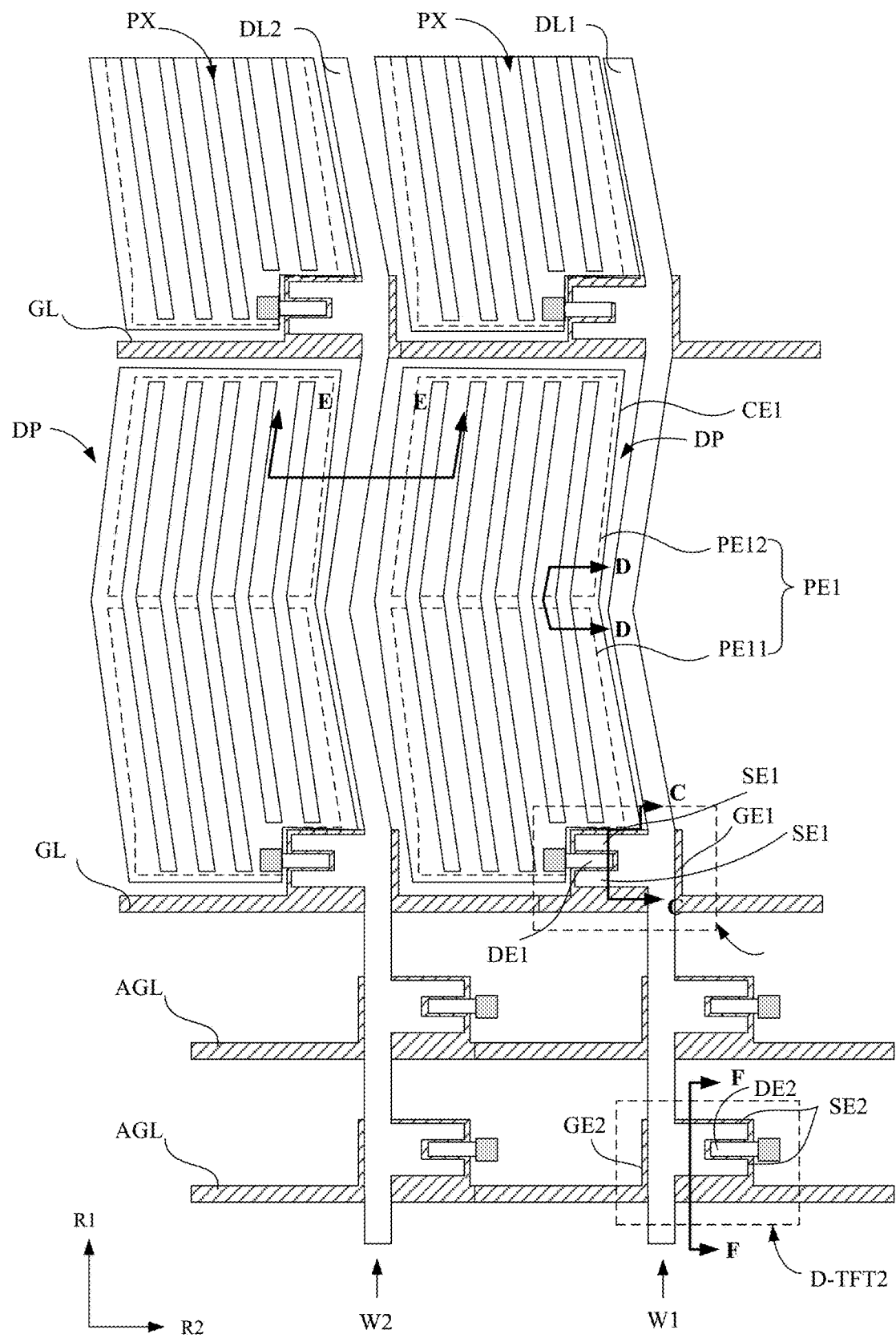
FIG. 10 is an enlarged partial structural view of a region N of the display substrate of FIG. 1.

FIG. 10 is an enlarged partial structural view of a region N of the display substrate of FIG. 1.

As shown in FIGS. 1 and 10, the display substrate 100 further includes a dummy pixel array region DPA provided in the display region AA and adjacent to the peripheral region PA, for example, adjacent to the peripheral transition region PTA. As shown in FIG. 10, in the dummy pixel array region, two adjacent gate lines GL intersect with a plurality of first data lines DL1 and a plurality of second data lines DL2 to form a plurality of dummy pixel regions, and each dummy pixel region is provided with a dummy pixel DP. For example, the plurality of dummy pixels DP are provided in an array to form a dummy pixel array.

In the embodiments of the present disclosure, the dummy pixel DP for example has the structure same as or different from the display pixel PX. In the case that the structure of the dummy pixel DP is the same as that of the display pixel PX, it is more favorable for the dummy pixel DP to simulate the working state of the display pixel PX, thus it is more favorable for static electricity to be released from the dummy pixel DP, that is, breakdown occurs at the dummy pixel DP. In the embodiments of the present disclosure, for example, the dummy pixel DP has the structure same as the display pixel PX shown in FIG. 9.

In the embodiments of the present disclosure, each dummy pixel DP is electrically connected to the conductive transition line W, so that in the case that the static electricity is introduced into the display region from the conductive transition line W, the static electricity is discharged from the dummy pixel DP first, thereby avoiding discharging static electricity at the display pixel PX.

For example, the plurality of dummy pixels DP are arranged in at least one row along at least part of the periphery of the display pixel array. The inventors find that, without providing the dummy pixels DP, the position of poor display (for example, poor bright spot) in the display region AA more likely occurs in the row of display pixels, closest to the peripheral region PA, among the display pixel array. Direct contact of two objects with different electrostatic potentials causes the shift of the electrostatic charges between the two objects. In the case that the energy of the electrostatic field increases to a certain extent, the two objects are broken down and the static electricity is discharged, which is the process of electrostatic discharge. In the embodiments of the present disclosure, by arranging at least one row of dummy pixels DP along at least part of the periphery of the display pixel array, the dummy pixels DP simulate the working state of the display pixels PX and the electrostatic charges are more easily discharged at the dummy pixels DP, this is because the dummy pixels DP are relatively closer to the contact pads that generate static electricity and first dummy thin film transistors in the dummy pixels DP are broken down. In this way, the display pixels PX in the display region are protected, thereby avoiding the occurrence of poor display.

For example, as shown in FIG. 1, a row of dummy pixels DP is provided at the lower side along the periphery of the display pixel array that is composed of the plurality of display pixels PX, and the dummy pixels DP are arranged in the second direction R2. It can be understood that, in order to increase the probability of electrostatic discharge, the dummy pixels DP may be arranged in a plurality of rows, so that electrostatic charges are discharged through two or more rows of dummy pixels DP in the case that static electricity is introduced into the display region from the conductive transition line W. Thus, the embodiments of the present disclosure do not limit the number of the dummy pixels DP and the number of rows of the dummy pixels DP.

For illustrative purposes, FIG. 1 shows only one row of dummy pixels DP provided at the lower side along the periphery of the display pixel array, and it can be understood that one or more rows of dummy pixels DP may be provided at the left, right and upper sides along the periphery of the display pixel array. For example, in one example, a row of dummy pixels are provided at the left side along the periphery of the display pixel array, so that static electricity entering the display region from another peripheral bonding region on the left side of the display region AA are effectively discharged.

Figure 11:
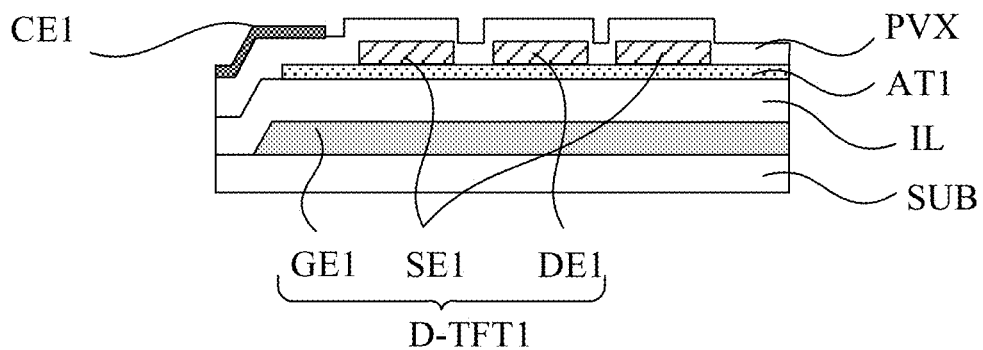
FIG. 11 is a schematic cross-sectional view taken along a line C-C of FIG. 10.
Figure 12:
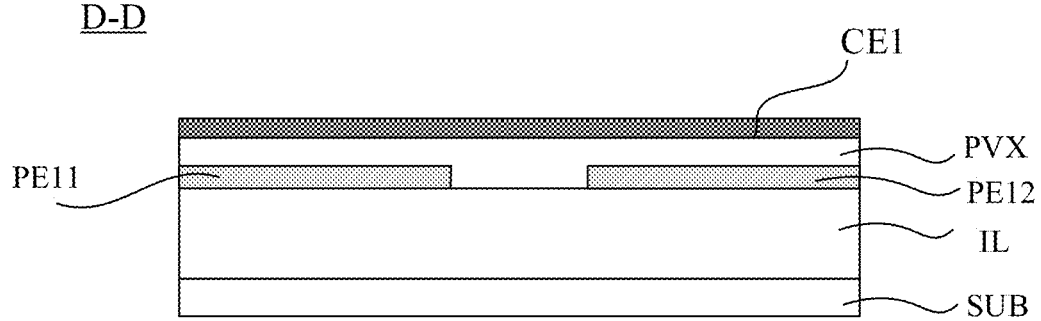
FIG. 12 is a schematic cross-sectional view taken along a line D-D of FIG. 10.
Figure 13:
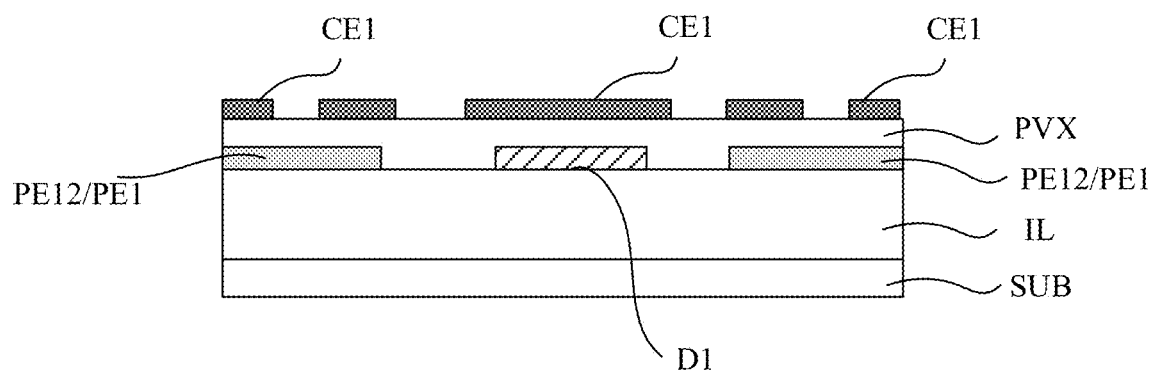
FIG. 13 is a schematic cross-sectional view taken along a line E-E of FIG. 10.

FIG. 11 is a schematic cross-sectional view taken along a line C-C of FIG. 10. FIG. 12 is a schematic cross-sectional view taken along a line D-D of FIG. 10. FIG. 13 is a schematic cross-sectional view taken along a line E-E of FIG. 10.

As shown in FIGS. 11 to 13, for example, each dummy pixel DP includes a dummy pixel driving circuit, a dummy pixel electrode PE1 (i.e., a first dummy electrode), a passivation layer PVX, and a dummy common electrode CE1 (i.e., a second dummy electrode), all of which provided on the base substrate SUB.

For example, the dummy pixel driving circuit includes a first dummy thin film transistor D-TFT1, which has the same structure as the thin film transistor TFT shown in FIG. 9. For example, in the case that the thin film transistor TFT in FIG. 9 is of a bottom-gate type TFT, the first dummy thin film transistor D-TFT1 is also of a bottom-gate type TFT.

In the embodiments of the present disclosure, for example, the first dummy thin film transistor D-TFT1 has a structure same as or different from the structure of the thin film transistor TFT in the display pixel PX. In the case that the structure of the first dummy thin film transistor D-TFT1 is the same as that of the thin film transistor TFT in the display pixel PX, it is more beneficial for the first dummy thin film transistor D-TFT1 to simulate the working state of the thin film transistor TFT in the display pixel PX, so that it is easier for the first dummy thin film transistor D-TFT1 to be broken down, and it is more beneficial for static electricity to be released from the first dummy pixel DP. In a specific example, for example, the first dummy thin film transistor D-TFT1 has the same structure as the thin film transistor TFT shown in FIG. 9.

In the embodiments of the present disclosure, by providing the first dummy thin film transistor D-TFT1 to have the structure same as that of the thin film transistor TFT of the display pixel PX, the first dummy pixel DP completely simulates the structure of the display pixel PX, which is more beneficial to release the static electricity at the first dummy thin film transistor D-TFT1, thus avoiding the poor display phenomenon caused by static electricity introduced into the display pixel PX of the display region.

For example, as shown in FIGS. 11 and 12, the first dummy thin film transistor D-TFT1 includes a first dummy gate electrode GE1, a first dummy active layer AT1, a first dummy source electrode SE1, a first dummy drain electrode DE1, and an interlayer insulation layer IL. The first dummy gate electrode GE1 is provided in the same layer as the gate line GL, and the first dummy source electrode SE1 and the first dummy drain electrode DE1 are provided in the same layer as the first data line DL1. The interlayer insulation layer IL is provided between the first dummy gate electrode GE1 and the first dummy source electrode SE1 as well as the first dummy drain electrode DE1 in the third direction R3, for example, is provided between the first dummy gate electrode GE1 and the first dummy active layer AT1. The first dummy source electrode SE1 and the first dummy drain electrode DE1 are provided on the side of the first dummy active layer AT1 facing away from the first dummy gate electrode GE1.

For example, as shown in FIGS. 11 to 13, the dummy pixel electrode PE1 is provided on the side of the interlayer insulation layer IL facing away from the base substrate SUB, and is provided in the same layer as the first dummy source electrode SE1 as well as the first dummy drain electrode DE1 and the first data line DL1. As shown in FIG. 10, the first data line DL1 is electrically connected to the first dummy source electrode SE1 of the first dummy thin film transistor D-TFT, and the dummy pixel electrode PE1 is electrically connected to the first dummy drain electrode DE1, so that the data line signal transmitted on the first data line DL1 is applied to the dummy pixel electrode PE1.

In the case that the static electricity is introduced into the first group of contact pads P1, the static electricity needs to release at some positions. Because the dummy pixel electrode PE1 is electrically connected to the first data line DL1 through the first dummy drain electrode DE1, in the case that static electricity is introduced into the first group of conductive transition lines W1 through the first group of contact pads P1, the static electricity is released from the dummy pixel electrode PE1 because the first dummy source electrode SE1 and the first dummy drain electrode DE1 are conducted by the static electricity, thereby preventing the static electricity from entering the display pixels PX of the display region AA. In this way, in the case that a control signal needs to be provided to the first data line DL1, the control signal is normally input into the first group of conductive transition lines W1 and the first data line DL1 through the first group of contact pads P1.

The passivation layer PVX is provided on the side of the dummy pixel electrode PE1 facing away from the base substrate SUB, and the dummy common electrode CE1 is provided on the side of the passivation layer PVX facing away from the dummy pixel electrode PE1, so that the dummy pixel electrode PE1 and the dummy common electrode CE1 are insulated from each other by the passivation layer PVX.

In the embodiments of the present disclosure, the dummy pixel DP emits light or does not emit light. For example, the dummy pixel electrode PE1 and the dummy common electrode CE1 overlap with each other in the direction perpendicular to the base substrate SUB. In the case that a voltage difference is applied between the dummy pixel electrode PE1 and the dummy common electrode CE1, a transverse electric field is formed between the dummy pixel electrode PE1 and the dummy common electrode CE1, which effects on the liquid crystal molecules in the liquid crystal layer LC, causing the liquid crystal molecules to deflect. In the case that the light passing through the liquid crystal layer LC is incident on the opposite substrate 300, the black matrix layer BM in FIG. 9 is configured to block the dummy pixel DP, so that the light of the dummy pixel DP is blocked by the black matrix layer BM, thereby realizing that the dummy pixel DP does not emit light, and thus avoiding the interference of the dummy pixel DP on the light emission of the adjacent display pixels PX.

For example, the dummy pixel electrode PE1 is a plate-shaped electrode, and the dummy common electrode CE1 is a slit-shaped electrode including a plurality of strip electrodes. For example, as shown in FIGS. 10 and 12, the dummy pixel electrode PE1 includes a plate-shaped first dummy sub-electrode PE11 and a plate-shaped second dummy sub-electrode PE12, which are spaced from each other in the first direction R1 and are insulated from each other. The second dummy sub-electrode PE12 is provided on the side of the first dummy sub-electrode PE11 close to the display region AA. The first dummy sub-electrode is electrically connected to the first dummy drain electrode DE1, and the second dummy sub-electrode PE12 is not electrically connected to any conductive structure.

In the embodiments of the present disclosure, the dummy pixel electrode is divided into the first dummy sub-electrode PE11 and the second dummy sub-electrode PE12, which are independent from each other. In the case that the first dummy sub-electrode PE11 discharges static electricity, the second dummy sub-electrode PE12 closer to the display region AA is insulated from the first dummy sub-electrode PE11, and the static electricity is hardly conducted to the second dummy sub-electrode PE12 and thus is very difficult to be conducted to the display pixel PX.

It can be understood that the dummy pixel electrode PE1 may be a slit-shaped electrode and the dummy common electrode CE1 may be a plate-shaped electrode, which is not limited by the embodiments of the present disclosure.

For example, the dummy pixel electrode PE1 is provided in the same layer using the same material as the pixel electrode PE, and the dummy common electrode CE1 is provided in the same layer using the same material as the common electrode CE. For example, the first dummy source electrode SE1 and the first dummy drain electrode DE1 are provided in the same layer using the same material as the source electrode SE and the drain electrode DE. For example, the first dummy gate electrode GE1 is provided in the same layer using the same material as the gate electrode GE1. For example, the first dummy active layer AT1 is provided in the same layer using the same material as the active layer AT. In this way, the dummy pixel DP is formed at the same time as the display pixel PX, thus simplifying the manufacturing process and reducing the process steps.

Figure 14:
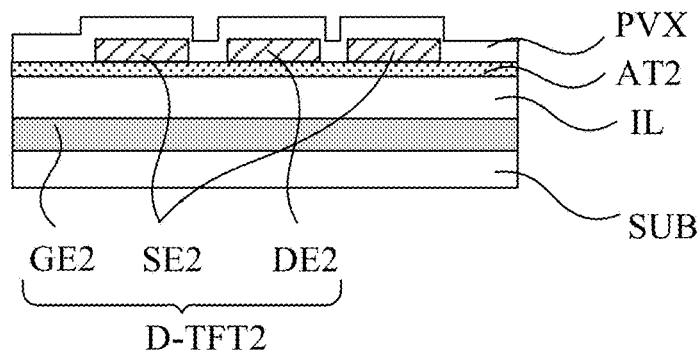
FIG. 14 is a schematic cross-sectional view taken along a line F-F of FIG. 10.

FIG. 14 is a schematic cross-sectional view taken along a line F-F of FIG. 10.

As shown in FIGS. 10 and 14, for example, the dummy pixel array region DPA further includes a plurality of second dummy thin film transistors D-TFT2. As shown in FIG. 10, the display substrate 100 further includes two auxiliary gate lines AGL which are parallel to the gate lines GL. The two adjacent auxiliary gate lines AGL intersect with the plurality of first data lines DL1 and the plurality of second data lines DL2 to form a plurality of dummy thin film transistor regions, and each dummy thin film transistor region is provided with a second dummy thin film transistor D-TFT2. For example, a plurality of second dummy thin film transistors D-TFT2 are provided in an array.

In the embodiments of the present disclosure, the second dummy thin film transistor D-TFT2 has a structure same as or different from the structure of the thin film transistor TFT in the display pixel PX. In the case that the structure of the second dummy thin film transistor D-TFT2 is the same as that of the thin film transistor TFT in the display pixel PX, the second dummy thin film transistor D-TFT2 simulates the working state of the thin film transistor TFT in the display pixel PX, which is more beneficial to release the electrostatic charge from the second dummy thin film transistor D-TFT2. In a specific example, the second dummy thin film transistor D-TFT2 has the same structure as that of the thin film transistor TFT of the display pixel PX, for example, has the same structure as the structure of the TFT shown in FIG. 9.

In the embodiments of the present disclosure, each second dummy thin film transistor D-TFT2 is electrically connected to the conductive transition line W, so that in the case that static electricity generated on the contact pad is to be introduced into the display region through the conductive transition line W, because the second dummy thin film transistor D-TFT2 is closer to the contact pad that generates static electricity than the dummy pixel DP, all or most of the electrostatic charges are discharged from the second dummy thin film transistor D-TFT2 first, so that the second dummy thin film transistor D-TFT2 is broken down. If there is still a small amount of electrostatic charge, it is discharged from the dummy pixel DP.

In the embodiments of the present disclosure, by arranging the second dummy thin film transistor D-TFT2, the electrostatic charges is discharged at two positions of the second dummy thin film transistor D-TFT2 and the dummy pixel DP, thus forming a double guarantee for the display region and further avoiding the poor display caused by discharging static electricity at the display pixel PX.

For example, a plurality of second dummy thin film transistors D-TFT2 are provided on the side of the dummy pixels DP facing away from the display region AA. The plurality of second dummy thin film transistors D-TFT2 are provided in at least one row along at least part of the periphery of the dummy pixel array. For example, as shown in FIG. 10, two rows of second dummy thin film transistors D-TFT2 are provided at the lower side along the periphery of the dummy pixel array composed of the plurality of dummy display pixels DP, so that the probability of electrostatic discharge is increased. Thus, the embodiments of the present disclosure do not specifically limit the number of the second dummy thin film transistor D-TFT2 and the number of rows of the second dummy thin film transistor D-TFT2.

In the embodiments of the present disclosure, regardless of which side along the display pixel array the dummy pixel DP is provided, such as the upper side, the lower side, the left side and the right side, the second dummy thin film transistor D-TFT2 is provided on the side of the dummy pixel DP facing away from the display region AA, and the second dummy thin film transistor D-TFT2 and the dummy pixel DP are connected to the same data line, so that in the case that static electricity is introduced from the conductive transition line connected to the data line, it is more beneficial for static electricity to be discharged at the second dummy thin film transistor D-TFT2.

For example, as shown in FIG. 14, each of the second dummy thin film transistors D-TFT2 includes a second dummy gate electrode GE2, a second dummy active layer AT2, and a second dummy source electrode SE2 and second dummy drain electrode DE2. For example, the second dummy gate electrode GE2 and the auxiliary gate line AGL are provided in the same layer and made of the same material and are electrically connected to each other. The auxiliary gate line AGL is configured to provide a gate signal to the second dummy gate electrode GE2. The second dummy source electrode SE2 is electrically connected to the first data line DL1.

For example, the second dummy source electrode SE2 and the second dummy drain electrode DE2 are provided in the same layer using the same material as the first dummy source electrode SE1 and the first dummy drain electrode DE1. For example, the second dummy gate electrode GE2 is provided in the same layer using the same material as the first dummy gate electrode GE1. For example, the second dummy active layer AT2 is provided in the same layer using the same material as the first dummy active layer AT1. In this way, the first dummy thin film transistor D-TFT1 and the second dummy thin film transistor D-TFT2 are formed at the same time, thus simplifying the manufacturing process and reducing the process steps.

Figure 15:
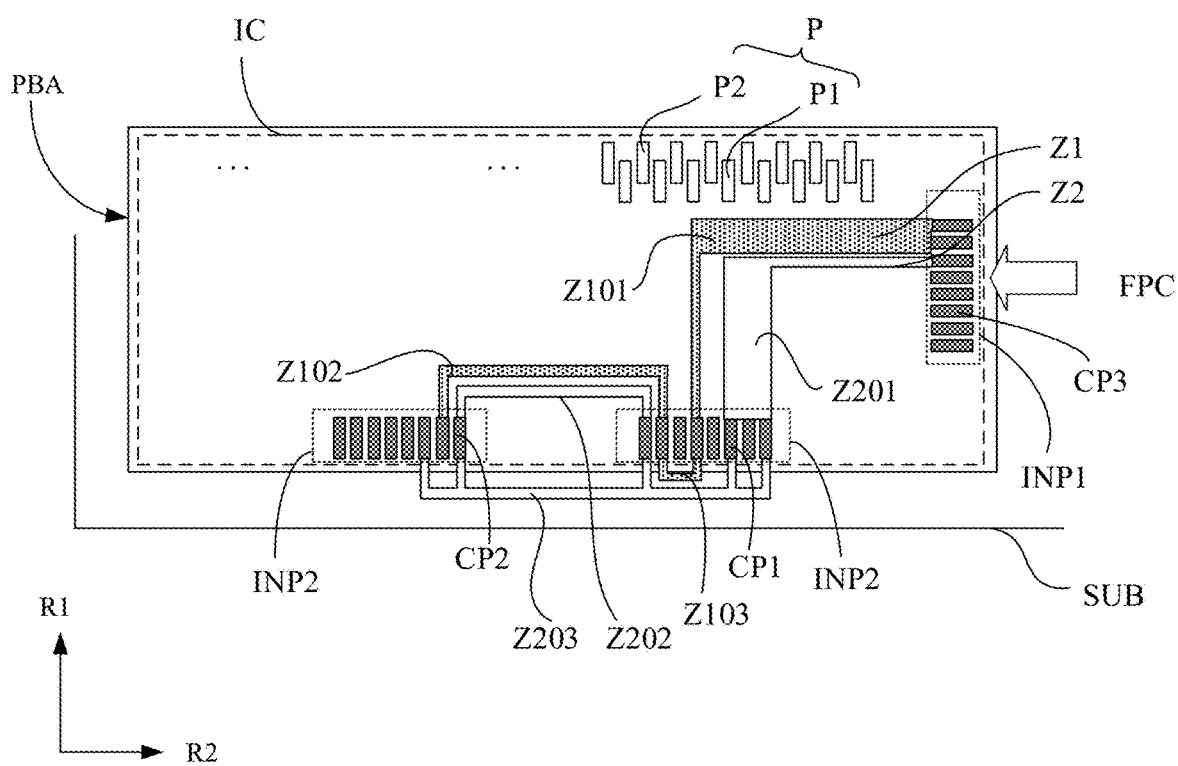
FIG. 15 is a schematic structural view of a peripheral bonding region of the display substrate provided by an embodiment of the present disclosure.

FIG. 15 is a schematic structural view of a peripheral bonding region of the display substrate provided by an embodiment of the present disclosure.

As shown in FIG. 15, for example, the display substrate 100 is further provided with a plurality of input contact pads provided in the peripheral bonding region PBA, and the driving chip IC is bonded in the peripheral bonding region PBA.

For example, the plurality of input contact pads include at least two groups of input contact pads, and the at least two groups of input contact pads includes a first group of input contact pads INP1 and a second group of input contact pads INP2. The first group of input contact pads INP1 is configured to receive an external signal provided by an external circuit (such as a flexible printed circuit board, FPC), the external signal includes but does not limit to power supply voltage, common voltage, grounding, etc. The first conductive connection line Z1 and the second conductive connection line Z2 are electrically connected between the first group of input contact pads INP1 and the second group of input contact pads INP2, and are configured to transmit the external signal received by the first group of input contact pads INP1 to the second group of input contact pads INP2. The second group of input contact pads INP2 is configured to transmit the external signal to the driving chip IC. The plurality of contact pads P are electrically connected with the driving chip IC and serve as output contact pads of the driving chip IC, and the driving chip IC provides a control signal to the plurality of contact pads P, thereby providing the control signal to the signal lines in the display region AA through the plurality of contact pads P. In the embodiments of the present disclosure, by arranging the conductive connection line such as the first conductive connection line Z1 or the second conductive connection line Z2 between the first group of input contact pads INP1 and the second group of input contact pads INP2, it is beneficial to realize signal transmission between contact pads at different positions in the peripheral region and ensure the stability in signal transmission.

For example, the second group of input contact pads INP2 includes a plurality of first input contact pads CP1 and a plurality of second input contact pads CP2 which are provided at the edge of the same side of the peripheral bonding region PBA and spaced from each other. The first group of input contact pads INP1 includes a plurality of third input contact pads CP3.

For example, the first conductive connection line Z1 includes a first connection portion Z101, which is electrically connected between the third input contact pad CP3 and the first input contact pad CP1 for transmitting the external signal (e.g., the power supply voltage signal) from the third input contact pad CP3 to the first input contact pad CP1.

For example, the first conductive connection line Z1 further includes a second connection portion Z102, which is electrically connected between the first input contact pad CP1 and the second input contact pad CP2 for transmitting the external signal (e.g., the power supply voltage signal) from the first input contact pad CP1 to the second input contact pad CP2. In the embodiments of the present disclosure, the second connection portion Z102 is provided to realize signal transmission between the first input contact pad CP1 and the second input contact pad CP2 while keeping the signals on the first input contact pad CP1 and the second input contact pad CP2 consistent.

For example, the first conductive connection line Z1 further includes a third connection portion Z103, which is electrically connected between two first input contact pads CP1 for realizing signal transmission between the two first input contact pads CP1. In the embodiments of the present disclosure, by arranging the third connection portion Z103 between the two first input contact pads CP1, the stability and consistency of the signals on the two first input contact pads CP1 are ensured. In addition, In the embodiments of the present disclosure, the third connection portion Z103 and the first connection portion Z101 (and the second connection portion Z102) are respectively provided on opposite sides of the plurality of first input contact pads CP1 in the first direction R1, so that the space utilization ratio of the display substrate is improved.

For example, the second conductive connection line Z2 is configured to transmit another external signal (such as a ground signal) different from the external signal transmitted on the first conductive connection line Z1. The second conductive connection line Z2 includes a first connection portion Z201. The first connection portion Z201 is electrically connected between the third input contact pad CP3 and the first input contact pad CP1 for transmitting the external signal (such as the ground signal) from the third input contact pad CP3 to the first input contact pad CP1.

For example, the second conductive connection line Z2 further includes a second connection portion Z202, which is electrically connected between the first input contact pad CP1 and the second input contact pad CP2 for transmitting the external signal (such as the ground signal) from the first input contact pad CP1 to the second input contact pad CP2. In the embodiments of the present disclosure, by providing the second connection portion Z202, signal transmission is realized between the first input contact pad CP1 and the second input contact pad CP2 while keeping the signals on the first input contact pad CP1 and the second input contact pad CP2 consistent.

For example, the second conductive connection line Z2 further includes a third connection portion Z203, which is electrically connected between the first input contact pad CP1 and the second input contact pad CP2 (for example, between three first input contact pads CP1 and two second input contact pads CP2 shown in the Figure) for realizing signal transmission between these input contact pads to ensure the stability and consistency of signals on these input contact pads. In the embodiments of the present disclosure, by arranging the third connection portion Z203 and the first connection portion Z201 (and the second connection portion Z202) on opposite sides of the plurality of first input contact pads CP1 in the first direction R1, the space utilization ratio of the display substrate is improved.

It can be understood that the total numbers of the first input contact pads CP1 and the second input contact pads CP2 connected by the third connection portion Z203 shown in the drawing is only for illustrative purpose, and the embodiments of the present disclosure is not limited thereto.

In the embodiments of the present disclosure, by arranging the third connection portion Z103 and the third connection portion Z203, the stability of signal transmission is realized without increasing the width of the lower frame of the display substrate.

It can be understood that because the second group of input contact pads INP2, the first group of contact pads P1 and the second group of contact pads P2 all need to be bonded with the driver IC, the first group of contact pads P1 and the second group of contact pads P2 are relatively close to the first conductive connection line Z1 and the second conductive connection line Z2 in order to reduce the frame size; and in this case, the design according to the embodiments of the present disclosure avoids poor display caused by static electricity due to too close distance between the conductive connection lines and the contact pads.

In the embodiments of the present disclosure, the routing modes of the first conductive connection line Z1 and the second conductive connection line Z2 in the peripheral region are related to the layout of the plurality of input contact pads. The routing modes of the first conductive connection line Z1 and the second conductive connection line Z2 shown in FIG. 15 are only for illustrative purpose, and those skilled in the art designs other routing modes of the first conductive connection line Z1 and the second conductive connection line Z2 according to actual needs, and the embodiments of the present disclosure is not limited thereto.

Figure 16:
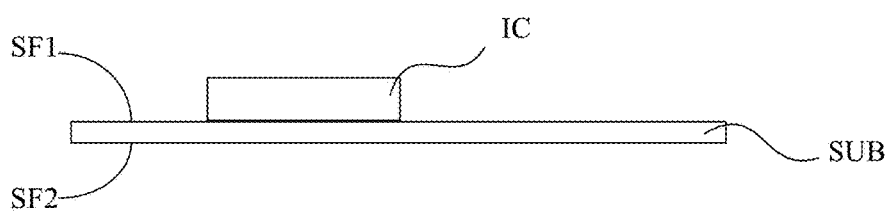
FIG. 16 is a simplified schematic cross-sectional view of a peripheral bonding region of the display substrate provided by an embodiment of the present disclosure.

FIG. 16 is a simplified schematic cross-sectional view of a peripheral bonding region of the display substrate provided by an embodiment of the present disclosure.

As shown in FIG. 16, for example, the display substrate includes a display side, and the peripheral bonding region PBA includes a first surface SF1 provided on the display side and a second surface SF2 opposite to the display side.

Referring to FIGS. 15 and 16, the plurality of contact pads P, the plurality of input contact pads INP, the first conductive connection line Z1, the second conductive connection line Z2 and the driving chip IC are all provided on the first surface SF1. For the sake of simplification, FIG. 16 only shows the driving chip IC.

Figure 17:
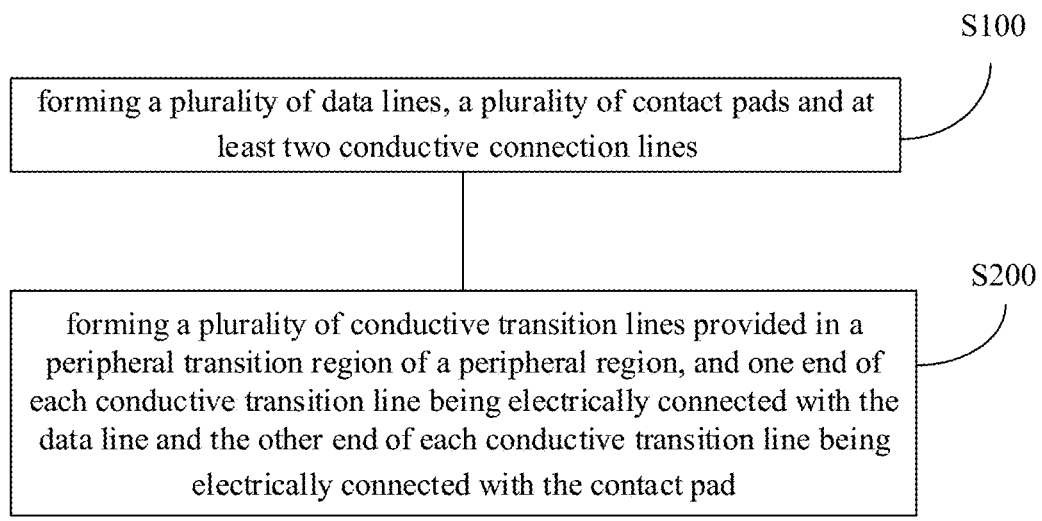
FIG. 17 is a flowchart of a manufacturing method of a display substrate provided by an embodiment of the present disclosure.

FIG. 17 is a flowchart of a manufacturing method of a display substrate provided by an embodiment of the present disclosure. For example, at least one embodiment of the present disclosure also provides a manufacturing method of the display substrate 100 shown in FIG. 1, which includes:

S100: forming the plurality of data lines D, the plurality of contact pads P and at least two conductive connection lines Z1 and Z2.

For example, the plurality of data lines D are provided in the display region AA of the display substrate 100 and configured to provide signals to the display region AA, the plurality of contact pads P are provided in the peripheral region PA of the display substrate and are electrically connected with the plurality of data lines D, and the at least two conductive connection lines Z1, Z2 are provided in the peripheral region PA and on the side of the plurality of contact pads P facing away from the display region AA, and the at least two conductive connection lines Z1, Z2 are spaced from and insulated from each other.

For example, the first group of contact pads P1 among the plurality of contact pads P is provided in the first conductive layer ECL1, the first conductive connection line Z1 is provided in the second conductive layer ECL2, and the first conductive layer ECL1 and the second conductive layer ECL2 are different layers.

In the manufacturing method of the display substrate provided by at least one embodiment of the present disclosure, by arranging the first group of contact pads P1 and the first conductive connection line Z1 closest to the first group of contact pads P1 in two different conductive layers, it is possible to avoid the formation of the tip electric field between the first group of contact pads P1 and the first conductive connection line Z1, thereby preventing electrostatic discharge and conduction, and reducing or even eliminating display defects in the display region.

For example, the above manufacturing method further includes:

S200: forming the plurality of conductive transition lines W in the peripheral transition region PTA of the peripheral region PA, and one end of each conductive transition line W being electrically connected with the data line D and the other end of each conductive transition line being electrically connected with the contact pad P.

For example, the first group of data lines DL1 among the plurality of data lines D, the first group of conductive transition lines W1 among the plurality of conductive transition lines W and the first group of contact pads P1 are all provided in the first conductive layer ECL1 and are integral with each other.

In one example, a first conductive film is first formed, and then the first conductive film is patterned by a patterning process to simultaneously form the first group of data lines DL1, the first group of conductive transition lines W1 and the first group of contact pads P1. With the above manufacturing method, the manufacturing process of the first group of data lines DL1, the first group of conductive transition lines W1 and the first group of contact pads P1 is simplified.

For example, the second group of data lines DL2 among the plurality of data lines D are provided in the first conductive layer ECL1, the second group of conductive transition lines W2 and the second group of contact pads P2 among the plurality of contact pads P are provided in the second conductive layer ECL2 and are integral with each other.

In one example, a second conductive film is first formed, and then the second conductive film is patterned by a patterning process to simultaneously form the second group of conductive transition lines W2 and the second group of second contact pads P2, so that the manufacturing process of the second group of conductive transition lines W2 and the second group of second contact pads P2 is simplified.

For example, the first conductive film and the second conductive film include a metal material or an alloy material, such as metal single-layer structure or metal multi-layer structure formed by molybdenum, aluminum, titanium and the like, and the materials of the first conductive film and the second conductive film may be the same or different from each other.

In the display substrate, the manufacturing method thereof and the display device provided by at least one embodiment of the present disclosure, by respectively arranging at least part of the plurality of contact pads and the first conductive connection line closest to the at least part of the plurality of contact pads in two different conductive layers, the formation of the tip electric field between the at least part of the plurality of contact pads and the first conductive connection line is avoided, thereby preventing electrostatic discharge and conduction, and reducing or even eliminating poor display in the display region. In at least some embodiments, the dummy pixels are provided: in the case that static electricity is introduced into the display region from the conductive transition lines, static electricity is discharged from the dummy pixels first, thereby avoiding discharging static electricity at the display pixels. In at least some embodiments, the second dummy thin film transistor is provided: in the case that static electricity is introduced into the display region from the conductive transition lines, the static electricity is discharged from the second dummy thin film transistor first, thereby further avoiding discharging static electricity at the display pixels.

In present disclosure, the following points need to be explained:

(1) The drawings of the embodiments of the present disclosure only relate to the structures related to the embodiments of the present disclosure, and other structures may refer to the general design.

(2) For the sake of clarity, in the drawings for describing the embodiments of the present disclosure, the thickness of layers or regions is enlarged or reduced, that is, these drawings are not drawn based on actual scale.

(3) Without conflict, the embodiments of the present disclosure and the features in the embodiments can be combined with each other to obtain a new embodiment.

The above are only exemplary embodiments of the present disclosure, and are not intended to limit the scope of protection of the present disclosure, which is defined by the claims.

What is claimed is:

1. A display substrate, comprising: a display region and a peripheral region provided on at least one side of the display region, the display substrate further comprising:
   a plurality of signal lines, provided in the display region and configured to provide signals to the display region;
   a plurality of contact pads, provided in the peripheral region and configured to be electrically connected with the plurality of signal lines; and
   at least two conductive connection lines, provided in the peripheral region and on a side of the plurality of contact pads facing away from the display region, wherein the at least two conductive connection lines are spaced from each other, and the at least two conductive connection lines comprise a first conductive connection line closest to the plurality of contact pads in a first direction from the display region to the peripheral region,
   wherein the plurality of contact pads comprise a first group of contact pads and a second group of contact pads, and the first group of contact pads are provided in a first conductive layer,
   wherein the first group of contact pads and the first conductive connection line are provided in different layers;
   the first group of contact pads and the second group of contact pads are staggered with each other in the first direction, and the second group of contact pads are further away from the first conductive connection line than the first group of contact pads.

2. The display substrate according to claim 1, wherein:
the first group of contact pads and the second group of contact pads are staggered in the first direction by x contact pads, where 0.5≤x≤1.5; and
the first group of contact pads and the second group of contact pads do not overlap with the at least two conductive connection lines in a direction perpendicular to the display substrate.

3. The display substrate according to claim 1, wherein:
the peripheral region comprises a peripheral bonding region and a peripheral transition region provided between the peripheral bonding region and the display region;
the display substrate further comprises a plurality of conductive transition lines provided in the peripheral transition region and connected with the plurality of signal lines;
the plurality of contact pads are provided in the peripheral bonding region and connected with the plurality of conductive transition lines;
the plurality of signal lines include a first group of signal lines and a second group of signal lines, the plurality of conductive transition lines comprise a first group of conductive transition lines and a second group of conductive transition lines, and the first group of conductive transition lines are connected to the first group of signal lines on a side close to the first group of signal lines and are connected to the first group of contact pads on a side close to the first group of contact pads; and
the first group of signal lines, the first group of conductive transition lines and the first group of contact pads are all provided in the first conductive layer.

4. The display substrate according to claim 3, wherein:
the second group of conductive transition lines are connected to the second group of signal lines on a side close to the second group of signal lines and are connected to the second group of contact pads on a side close to the second group of contact pads;
the second group of signal lines is provided in the first conductive layer, and the second group of conductive transition lines and the second group of contact pads are provided in a second conductive layer.

5. The display substrate according to claim 4, further comprising:
a base substrate; and
a display pixel array provided on the base substrate, the display pixel array being provided in the display region, the display pixel array comprising a display pixel driving circuit, a first display electrode, a passivation layer and a second display electrode, and the first display electrode and the second display electrode being configured to generate an electric field, wherein:
the display pixel driving circuit comprises a thin film transistor, the thin film transistor comprises a gate electrode, a source electrode, a drain electrode and an interlayer insulation layer, the interlayer insulation layer is provided between the gate electrode and the source electrode as well as the drain electrode in a direction perpendicular to the base substrate;
the first display electrode is provided in a same layer as the source electrode as well as the drain electrode, and the first display electrode is electrically connected with one of the source electrode and the drain electrode;
the passivation layer is provided on a side of the first display electrode facing away from the base substrate;
the second display electrode is provided on a side of the passivation layer facing away from the first display electrode; and
one of the first conductive layer and the second conductive layer is provided in a same layer as the gate electrode and the other of the first conductive layer and the second conductive layer is provided in a same layer as the source electrode as well as the drain electrode.

6. The display substrate according to claim 5, wherein:
the source electrode and the drain electrode are provided on a side of the gate electrode facing away from the base substrate;
the first conductive layer is provided on a side of the second conductive layer facing away from the base substrate;
the first conductive layer, the source electrode and the drain electrode are provided in a same layer using a same material, and the second conductive layer and the gate electrode are provided in a same layer using a same material.

7. The display substrate according to claim 5, wherein:
the passivation layer and the interlayer insulation layer are configured to extend to the peripheral region;
the interlayer insulation layer is provided on a side of the second group of conductive transition lines facing away from the base substrate;
the second group of signal lines is provided on a side of the interlayer insulation layer facing away from the second group of conductive transition lines;
the passivation layer is provided on a side of the second group of signal lines and the interlayer insulation layer facing away from the base substrate;
the peripheral transition region is further provided with a first via hole, a second via hole and a transition conductive pattern,
the first via hole penetrates the passivation layer to expose at least one signal line in the second group of signal lines,
the second via hole penetrates the passivation layer and the interlayer insulation layer to expose at least one conductive transition line, corresponding to the at least one signal line, in the second group of conductive transition lines,
the transition conductive pattern covers the first via hole and the second via hole to electrically connect the at least one signal line and the at least one conductive transition line.

8. The display substrate according to claim 1, wherein the at least two conductive connection lines further comprise:
a second conductive connection line, provided on a side of the first conductive connection line facing away from the plurality of contact pads.

9. The display substrate according to claim 8, wherein the first conductive connection line and the second conductive connection line are configured to transmit signals provided by an external circuit.

10. The display substrate according to claim 1, further comprising:
a base substrate;
a display pixel array provided on the base substrate, the display pixel array being provided in the display region; and
a dummy pixel array region provided on the base substrate, the dummy pixel array region comprising a plurality of dummy pixels provided in at least one row along at least part of a periphery of a display pixel array;

wherein each of the dummy pixels is configured to be electrically connected with one of the plurality of contact pads.

11. The display substrate according to claim 10, wherein:
the dummy pixel comprises a dummy pixel driving circuit, a first dummy electrode and a second dummy electrode;
the dummy pixel driving circuit comprises a first dummy thin film transistor, the first dummy thin film transistor comprises a first dummy gate electrode, a first dummy source electrode and a first dummy drain electrode;
the first dummy electrode is provided in a same layer as the first dummy source electrode as well as the first dummy drain electrode;
the second dummy electrode is provided on a side of the first dummy electrode facing away from the base substrate and is spaced from the first dummy electrode; and
the first dummy electrode is configured to be electrically connected with one of the first dummy source electrode and the first dummy drain electrode, and the other of the first dummy source electrode and the first dummy drain electrode is configured to be electrically connected with one of the plurality of conductive transition lines.

12. The display substrate according to claim 11, wherein:
the first dummy electrode comprises a first dummy sub-electrode and a second dummy sub-electrode, which are spaced from each other in the first direction and are insulated from each other;
the second dummy sub-electrode is provided on a side of the first dummy sub-electrode close to the display region.

13. The display substrate according to claim 12, wherein:
one of the first dummy electrode and the second dummy electrode is a dummy pixel electrode, and the other of the first dummy electrode and the second dummy electrode is a dummy common electrode, and the dummy pixel electrode and the dummy common electrode overlap with each other in a direction perpendicular to the base substrate;
the dummy pixel electrode is a plate-shaped electrode, and the dummy common electrode is a slit-shaped electrode.

14. The display substrate according to claim 10, wherein:
the dummy pixel array region further comprises a plurality of second dummy thin film transistors provided at a side of the dummy pixels facing away from the display region;
the plurality of second dummy thin film transistors are provided in at least one row along at least part of a periphery of the dummy pixel array region; and
each of the second dummy thin film transistors comprises a second dummy gate electrode, a second dummy source electrode and a second dummy drain electrode, and one of the second dummy source electrode and the second dummy drain electrode is configured to be electrically connected with one of the plurality of conductive transition lines.

15. The display substrate according to claim 1, wherein each of the at least part of the plurality of contact pads extends along the first direction, and an extension direction of at least part of each of the at least two conductive connection lines intersects with the first direction.

16. The display substrate according to claim 1, further comprising a plurality of input contact pads provided in the peripheral region, wherein:

the plurality of input contact pads comprise at least two groups of input contact pads, the at least two groups of input contact pads comprise a first group of input contact pads and a second group of input contact pads, and each of the at least two conductive connection lines is electrically connected between the first group of input contact pads and the second group of input contact pads; and
the first group of input contact pads is configured to receive an external signal provided by an external circuit, and each of the at least two conductive connection lines is configured to transmit the external signal received by the first group of input contact pads to the second group of input contact pads.

17. A display device, comprising a display substrate, wherein the display substrate comprises:
a display region and a peripheral region provided on at least one side of the display region, the display substrate further comprising:
a plurality of signal lines, provided in the display region and configured to provide signals to the display region;
a plurality of contact pads, provided in the peripheral region and configured to be electrically connected with the plurality of signal lines; and
at least two conductive connection lines, provided in the peripheral region and on a side of the plurality of contact pads facing away from the display region, wherein the at least two conductive connection lines are spaced from each other, and the at least two conductive connection lines comprise a first conductive connection line closest to the plurality of contact pads in a first direction from the display region to the peripheral region,
wherein the plurality of contact pads comprise a first group of contact pads and a second group of contact pads, and the first group of contact pads are provided in a first conductive layer, the first group of contact pads and the first conductive connection line are provided in different layers;
wherein the first group of contact pads and the second group of contact pads are staggered with each other in the first direction, and the second group of contact pads are further away from the first conductive connection line than the first group of contact pads.

18. The display device according to claim 17, further comprising a driving chip, and the display substrate further comprising a plurality of input contact pads provided in the peripheral region, wherein:
the plurality of input contact pads comprise at least two groups of input contact pads, the at least two groups of input contact pads comprise a first group of input contact pads and a second group of input contact pads, and each of the at least two conductive connection line is electrically connected between the first group of input contact pads and the second group of input contact pads; and
the plurality of contact pads are electrically connected with the driving chip and serve as output contact pads of the driving chip, and the driving chip is configured to provide a control signal to the plurality of contact pads.

19. A manufacturing method of a display substrate, comprising:
forming a plurality of signal lines, a plurality of contact pads and at least two conductive connection lines, wherein:

the plurality of signal lines are provided in a display region of the display substrate and configured to provide signals to the display region, the plurality of contact pads are provided in a peripheral region of the display substrate and electrically connected with the plurality of signal lines, the at least two conductive connection lines are provided in the peripheral region and on a side of the plurality of contact pads facing away from the display region, and the at least two conductive connection lines comprise a first conductive connection line closest to the plurality of contact pads in a first direction from the display region to the peripheral region; and the plurality of contact pads comprise a first group of contact pads and a second group of contact pads, and the first group of contact pads are provided in a first conductive layer, the first group of contact pads and the first conductive connection line are provided in different layers;

the first group of contact pads and the second group of contact pads are staggered with each other in the first direction, and the second group of contact pads are further away from the first conductive connection line than the first group of contact pads.

* * * * *